US012701404B2

(12) United States Patent (10) Patent No.: US 12,701,404 B2
Jin et al. (45) Date of Patent: Aug. 4, 2026

(54) METHOD AND DEVICE FOR PROVIDING TERMINAL CAPABILITY INFORMATION IN WIRELESS COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 18/014,456

(22) PCT Filed: Jun. 22, 2021

(86) PCT No.: PCT/KR2021/007803
§ 371 (c)(1),
(2) Date: Jan. 4, 2023

(87) PCT Pub. No.: WO2022/010135
PCT Pub. Date: Jan. 13, 2022

(65) Prior Publication Data
US 2023/0276227 A1 Aug. 31, 2023

(30) Foreign Application Priority Data
Jul. 7, 2020 (KR) ........................ 10-2020-0083605

(51) Int. Cl.
*H04W 8/24* (2009.01)
*H04W 76/10* (2018.01)

(52) U.S. Cl.
CPC ............. *H04W 8/24* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 11,218,870 B2 | 1/2022 | Jin et al. | |
| 2018/0227964 A1 | 8/2018 | Wang et al. | |
| (Continued) | | | |

FOREIGN PATENT DOCUMENTS

| | | | |
|---|---|---|---|
| CN | 202010071985 | * | 1/2020 |
| WO | 2019/066547 A1 | | 4/2019 |
| (Continued) | | | |

OTHER PUBLICATIONS

Author Unknown, Higher-layer aspects for Redcap, Doc No. R1-2003292 pp. 1-8, Jun. 5, (Year: 2020).*

(Continued)

*Primary Examiner* — Christopher M Crutchfield
(74) *Attorney, Agent, or Firm* — Jefferson IP Law, LLP

(57) ABSTRACT

The disclosure provides a method of reporting user equipment (UE) capability information by a UE, the method including receiving, from a base station (BS), system information including an indicator supporting a type 2 UE; performing camp-on for a serving cell corresponding to the BS based on the system information; performing a radio resource control (RRC) connection establishment procedure with the BS; transmitting, to the BS, an RRCSetupRequest message including type 1 capability information of the UE; receiving an RRCSetup message from the BS; transmitting, to the BS, type 3 UE capability information of the UE in an RRCSetupComplete message in response to the RRCSetup message; receiving a UE capability enquiry message from the BS; and transmitting at least one of the type 1 capability information, type 2 capability information and type 3 capability information of the UE to the BS in response to the UE capability enquiry message.

16 Claims, 12 Drawing Sheets

(56) References Cited

U.S. PATENT DOCUMENTS

| | | | | |
|---|---|---|---|---|
| 2019/0230499 | A1 | 7/2019 | Sun et al. | |
| 2020/0053818 | A1 | 2/2020 | Sillanpaa et al. | |
| 2021/0258768 | A1* | 8/2021 | Liu | H04W 8/24 |
| 2023/0038753 | A1* | 2/2023 | Tan | H04W 74/0841 |
| 2023/0217498 | A1* | 7/2023 | Lee | H04W 74/0833 |
| | | | | 370/329 |
| 2023/0354432 | A1* | 11/2023 | Behravan | H04W 74/0833 |

FOREIGN PATENT DOCUMENTS

| | | | |
|---|---|---|---|
| WO | 2021/147580 | A1 | 7/2021 |
| WO | 2022/200684 | A1 | 9/2022 |

OTHER PUBLICATIONS

Xiaomi, Initial discussion on the complexity reduction for reduced capability device, R1-2004506, we3GPP TSG RAN WG1 #101, May 16, 2020, e-Meeting.

Motorola Mobility et al., Narrowband operation at reduced capability UEs, R1-2004374, 3GPP TSG RAN WG1 Meeting #101, May 16, 2020, e-Meeting.

Ericsson, Introduction of RRC Positioning, R2-2005890, 3GPP TSG-RAN WGZ Meeting #110-e, Jun. 15, 2020, Online.

International Search Report dated Sep. 28, 2021, issued in International Application No. PCT/KR2021/007803.

Huawei, HiSilicon, Other aspects for reduced capability devices, 3GPP TSG RAN WGI Meeting #101-e, RI-2004612, May 16, 2020, E-meeting.

Samsung, Clarification to use Cat.0 LCID for Rel-13 eMTC, 3GPP TSG-RAN WG2 Meeting #93, R2-161247, Feb. 14, 2021, Julian's, Malta.

Samsung, Indication of Cat.0 UE capability, 3GPP TSG-RAN2 Meeting #87bis, R2-144242, Oct. 5, 2014, Shanghai, P. R. China.

Extended European Search Report dated Dec. 5, 2023, issued in European Patent Application No. 21837489.0.

Korean Office Acton with English translation dated Jun. 10, 2025; Korean Appln. No. 10-2020-0083605.

European Communication under Rule 71(3) EPC dated Jun. 10, 2025; European Appln. No. 21 837 489.0-1206.

* cited by examiner

FIG. 1H

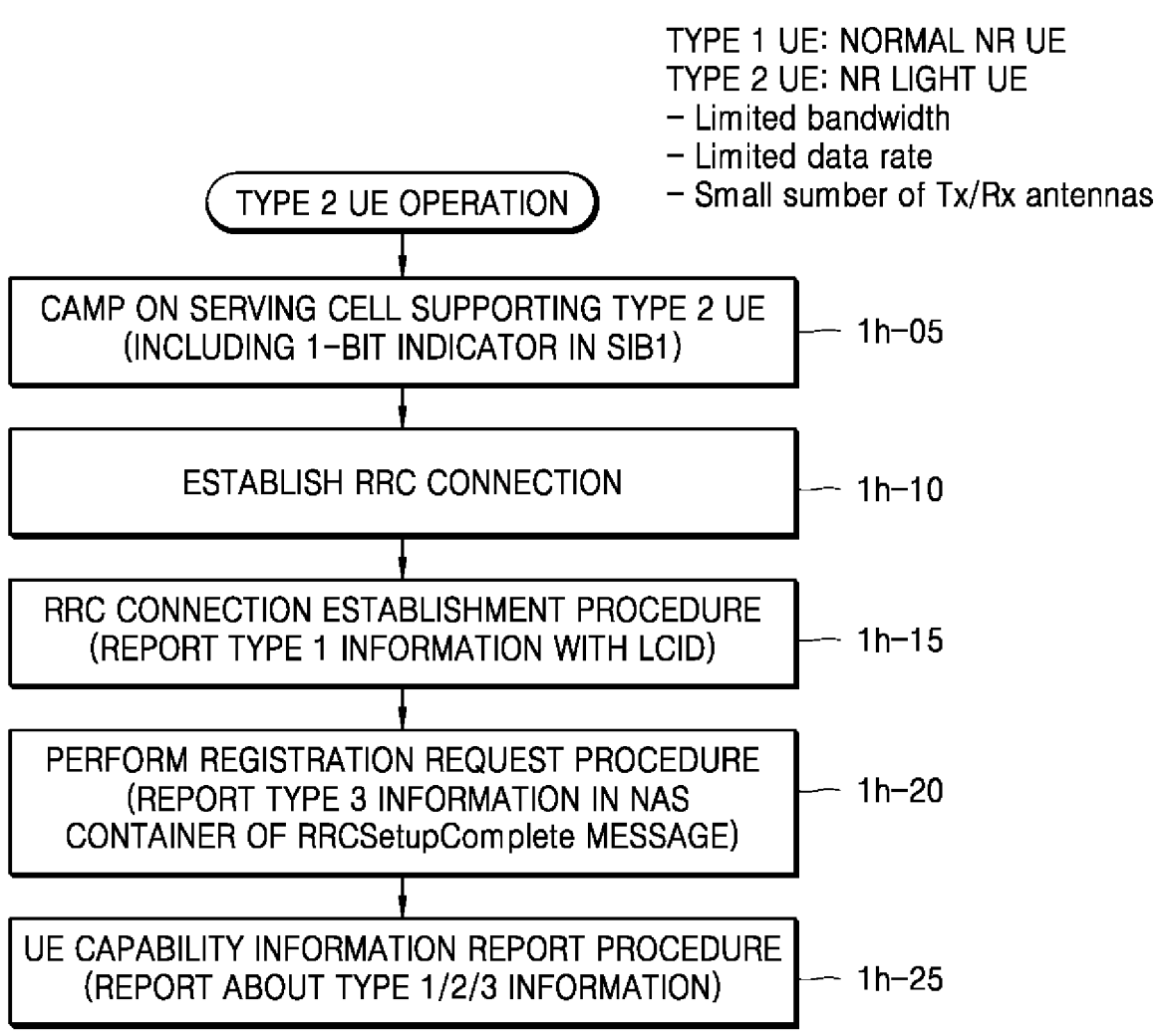

TYPE 1 UE: NORMAL NR UE
TYPE 2 UE: NR LIGHT UE
– Limited bandwidth
– Limited data rate
– Small sumber of Tx/Rx antennas

TYPE 2 UE OPERATION

CAMP ON SERVING CELL SUPPORTING TYPE 2 UE
(INCLUDING 1-BIT INDICATOR IN SIB1) — 1h-05

ESTABLISH RRC CONNECTION — 1h-10

RRC CONNECTION ESTABLISHMENT PROCEDURE
(REPORT TYPE 1 INFORMATION WITH LCID) — 1h-15

PERFORM REGISTRATION REQUEST PROCEDURE
(REPORT TYPE 3 INFORMATION IN NAS
CONTAINER OF RRCSetupComplete MESSAGE) — 1h-20

UE CAPABILITY INFORMATION REPORT PROCEDURE
(REPORT ABOUT TYPE 1/2/3 INFORMATION) — 1h-25

FIG. 1I

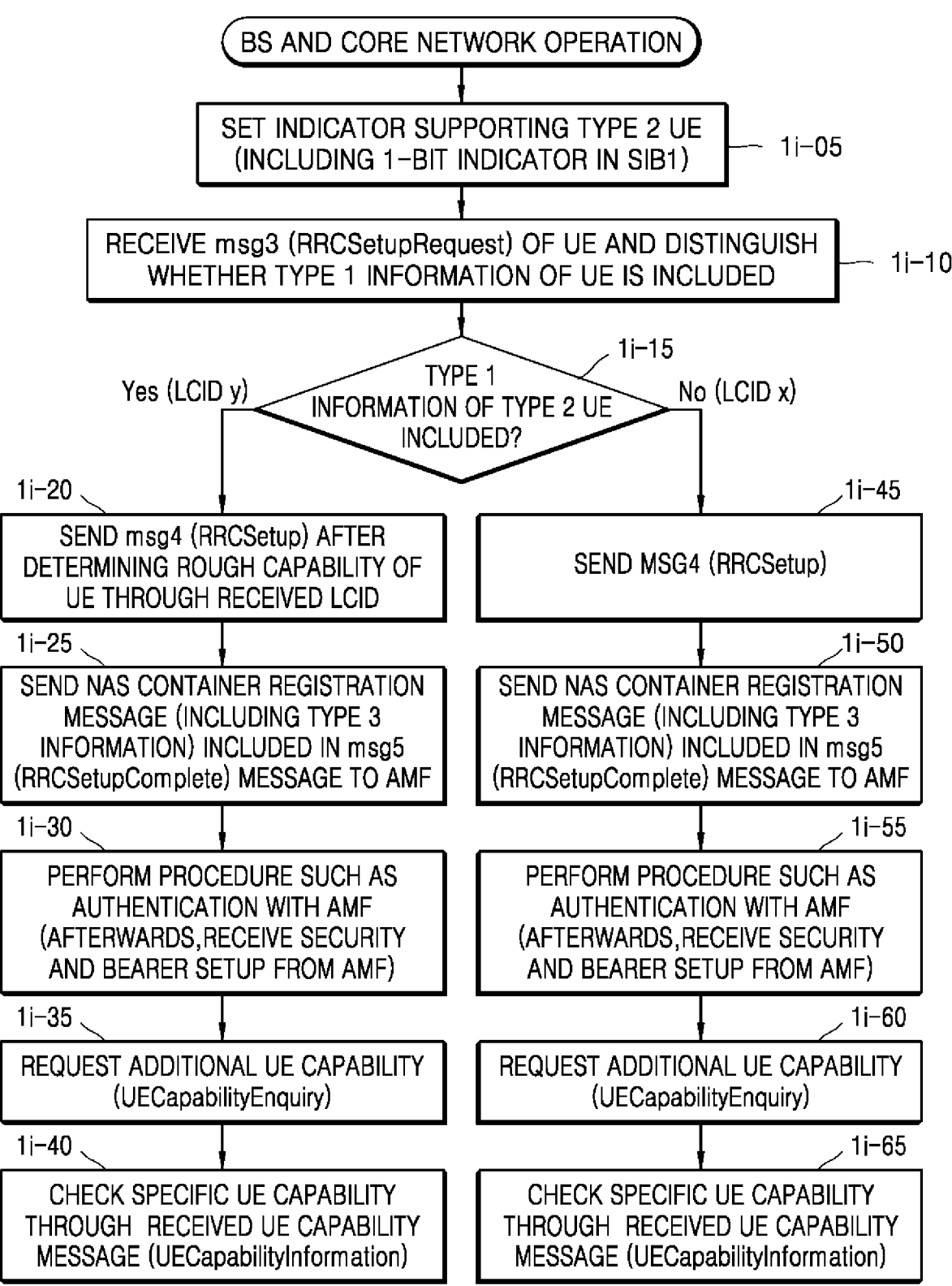

BS AND CORE NETWORK OPERATION

SET INDICATOR SUPPORTING TYPE 2 UE
(INCLUDING 1-BIT INDICATOR IN SIB1) — 1i-05

RECEIVE msg3 (RRCSetupRequest) OF UE AND DISTINGUISH
WHETHER TYPE 1 INFORMATION OF UE IS INCLUDED — 1i-10

1i-15

TYPE 1
INFORMATION OF TYPE 2 UE
INCLUDED?

Yes (LCID y)          No (LCID x)

1i-20

SEND msg4 (RRCSetup) AFTER
DETERMINING ROUGH CAPABILITY OF
UE THROUGH RECEIVED LCID 1i-45

SEND MSG4 (RRCSetup)

1i-25

SEND NAS CONTAINER REGISTRATION
MESSAGE (INCLUDING TYPE 3
INFORMATION) INCLUDED IN msg5
(RRCSetupComplete) MESSAGE TO AMF 1i-50

SEND NAS CONTAINER REGISTRATION
MESSAGE (INCLUDING TYPE 3
INFORMATION) INCLUDED IN msg5
(RRCSetupComplete) MESSAGE TO AMF 1i-30

PERFORM PROCEDURE SUCH AS
AUTHENTICATION WITH AMF
(AFTERWARDS,RECEIVE SECURITY
AND BEARER SETUP FROM AMF)

1i-55

PERFORM PROCEDURE SUCH AS
AUTHENTICATION WITH AMF
(AFTERWARDS,RECEIVE SECURITY
AND BEARER SETUP FROM AMF)

1i-35

REQUEST ADDITIONAL UE CAPABILITY
(UECapabilityEnquiry)

1i-60

REQUEST ADDITIONAL UE CAPABILITY
(UECapabilityEnquiry)

1i-40

CHECK SPECIFIC UE CAPABILITY
THROUGH RECEIVED UE CAPABILITY
MESSAGE (UECapabilityInformation)

1i-65

CHECK SPECIFIC UE CAPABILITY
THROUGH RECEIVED UE CAPABILITY
MESSAGE (UECapabilityInformation)

OPERATION OF UE IN IDLE MODE AND BS

OPERATION OF UE IN INACTIVE MODE AND BS

METHOD AND DEVICE FOR PROVIDING TERMINAL CAPABILITY INFORMATION IN WIRELESS COMMUNICATION SYSTEM

TECHNICAL FIELD

The disclosure relates to wireless communication systems and, more particularly, to a method of providing user equipment (UE) capability information.

BACKGROUND ART

To meet the explosively increasing demand with respect to wireless data traffic due to an increase in multimedia service and the commercialization of the 4G communication system, an advanced fifth generation (5G) communication system or pre-5G communication system is being developed. For this reason, the 5G or pre-5G communication system is also called a beyond fourth generation (4G) network communication system or post long term evolution (LTE) system.

Implementation of the 5G communication system using ultrahigh frequency (millimeter wave (mmWave)) bands, e.g., 60 giga hertz (GHz) bands, is being considered to increase data transfer rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion.

To improve system network performance, technologies for advanced small cells, cloud radio access networks (RANs), ultra-dense networks, device to device (D2D) communication, wireless backhaul, moving networks, cooperative communication, coordinated multi-points (CoMP), interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart homes, smart buildings, smart cities, smart cars or connected cars, smart grids, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, and array antenna schemes, etc. Even application of a cloud radio access network (cloud RAN) as the aforementioned big data processing technology may be an example of convergence of 5G and IoT technologies.

With the development of the aforementioned technologies and wireless communication systems, there is a need for a scheme to support seamless communication by enhancing a method of providing user equipment (UE) capability information in particular.

DISCLOSURE

Technical Problem

Embodiments of the disclosure provide a method and device for effectively providing services in a mobile communication system.

Technical Solution

Embodiments of the disclosure provide a method and device for providing user equipment (UE) capability information.

Advantageous Effects

Embodiments of the disclosure provide an apparatus and method capable of effectively providing a service in a mobile communication system.

DESCRIPTION OF DRAWINGS

FIG. 1H illustrates an operation of a type 2 UE reporting UE capability, according to an embodiment of the disclosure.

FIG. 1I illustrates an operation of a base station (BS) while a type 2 UE performs a UE capability reporting procedure when the type 2 UE is changed from an IDLE mode to a connected state, according to an embodiment of the disclosure.

FIG. 1K is a block diagram of a UE, according to an embodiment of the disclosure.

FIG. 1L is a block diagram of a BS, according to an embodiment of the disclosure.

BEST MODE

Figure 1A:
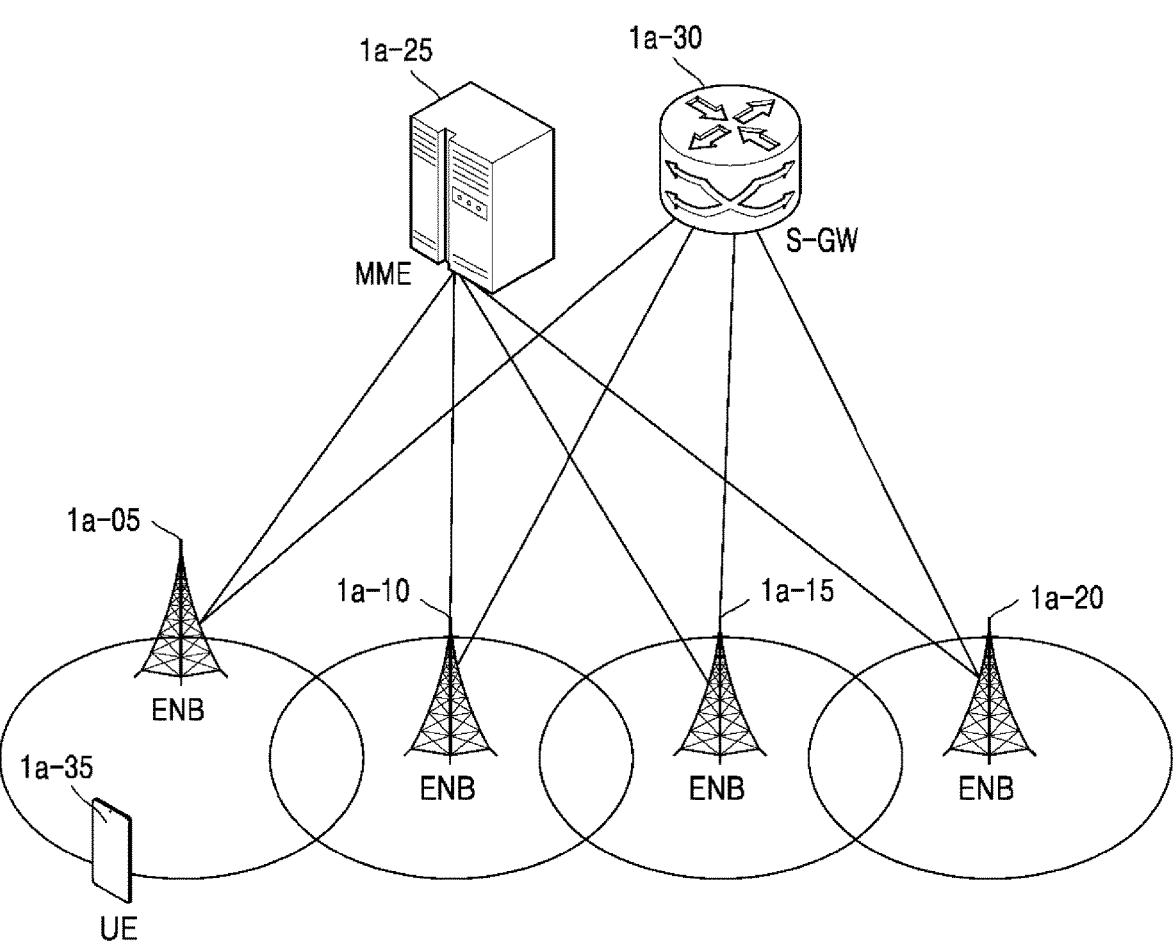
FIG. 1A illustrates a structure of a long term evolution (LTE) system, according to an embodiment of the disclosure.

According to an embodiment of the disclosure, a method of reporting user equipment (UE) capability information by a UE includes receiving, from a base station (BS), system information including an indicator supporting a type 2 UE; performing camp-on for a serving cell corresponding to the BS, based on the system information; performing a radio resource control (RRC) connection establishment procedure with the BS; transmitting, to the BS, an RRCSetupRequest message including type 1 capability information of the UE; receiving an RRCSetup message from the BS; transmitting, to the BS, type 3 UE capability information of the UE in an RRCSetupComplete message in response to the RRCSetup message; receiving a UE capability enquiry message from the BS; and transmitting at least one of the type 1 capability information, type 2 capability information and type 3 capability information of the UE to the BS in response to the UE capability enquiry message.

The type 1 capability information may include at least one of a maximum data rate, a maximum bandwidth, a buffer size and transmission power, the type 2 capability information may include at least one of whether to support INACTIVE wakeupsignal and a supported band list, and the type 3 capability information may include at least one of whether to support IDLE wakeupsignal, security information and location information.

The type 1 capability information may include a type 1 rough capability information and type 1 precise capability information, and the type 1 rough capability information may be transmitted in the RRCSetupRequest message and the type 1 precise capability information may be transmitted in a response to the UE capability enquiry message.

The type 1 capability information may be represented by a logical channel identifier (LCID), and the LCID may represent a type of common control channel (CCCH) service data unit (SDU).

The LCID may be allocated differently depending on type information of the UE, whether the UE capability information is included, and a connected state of the UE.

The type 3 capability information included in the RRC-SetupComplete message may be information for performing a registration request procedure with a core network, the RRCSetupComplete message may have a message for registration request included in a non-access stratum (NAS) container, and the RRCSetupComplete message may include at least one of information about whether to support enhanced discontinuous reception (eDRX) and information about whether to support a long term evolution (LTE) positioning protocol (LPP).

The type 3 capability information included in the RRC-SetupComplete message may be information for performing a registration request procedure with a core network, the RRCSetupComplete message may have a message for registration request in a non-access stratum (NAS) container, and the RRCSetupComplete message may include at least one of information about whether to support enhanced discontinuous reception (eDRX) and information about whether to support a long term evolution (LTE) positioning protocol (LPP).

According to an embodiment of the disclosure, a method of obtaining user equipment (UE) capability information in a base station (BS) includes transmitting system information including an indicator supporting a type 2 UE; transmitting, from a UE, an RRCSetupRequest message including type 1 capability information of the UE; determining whether the UE is a type 2 UE, based on the RRCSetupRequest message; transmitting, to the UE, a result of the determining and an RRCSetup message corresponding to the type 1 capability information; receiving, from the UE, type 3 UE capability information of the UE in an RRCSetupComplete message in response to the RRCSetup message; transmitting, to an access management function (AMF), a message for registration request included in a non-access stratum (NAS) container in the RRCSetupComplete message; performing an authentication procedure with the AMF; receiving a UE capability enquiry message to the UE; and receiving at least one of the type 1 capability information, type 2 capability information and type 3 capability information of the UE from the UE in response to the UE capability enquiry message.

The type 1 capability information may include at least one of a maximum data rate, a maximum bandwidth, a buffer size and transmission power, the type 2 capability information may include at least one of whether to support INACTIVE wakeupsignal and a supported band list, and the type 3 capability information may include at least one of whether to support IDLE wakeupsignal, security information and position information.

The type 1 capability information may include a type 1 rough capability information and type 1 precise capability information, and the type 1 rough capability information may be transmitted in the RRCSetupRequest message and the type 1 precise capability information may be transmitted in a response to the UE capability enquiry message.

The type 1 capability information may be represented by a logical channel identifier (LCID), and the LCID may represent information about a type of common control channel (CCCH) service data unit (SDU).

The LCID may be assigned differently depending on type information of the UE, whether the UE capability information is included, and a connected state of the UE.

The method may further include receiving, from the UE in an INACTIVE state, an RRCResumeRequest message; identifying an LCID in the RRCResumeRequest message; and applying UE information, based on a length of a CCCH SDU corresponding to the identified LCID.

According to an embodiment of the disclosure, a user equipment (UE) for reporting UE capability information includes a transceiver; and a processor coupled to the transceiver, which is configured to receive, from a base station (BS), system information including an indicator supporting a type 2 UE, perform camp-on for a serving cell corresponding to the BS, based on the system information, perform a radio resource control (RRC) connection setup procedure with the BS, transmit, to the BS, an RRCSetupRequest message including type 1 capability information of the UE, receive an RRCSetup message from the BS, transmit, to the BS, type 3 UE capability information of the UE in an RRCSetupComplete message in response to the RRCSetup message, receive a UE capability enquiry message from the BS, and transmit at least one of the type 1 capability information, type 2 capability information and type 3 capability information of the UE to the BS in response to the UE capability enquiry message.

A base station (BS) for obtaining a user equipment (UE) capability information includes a transceiver; and a processor coupled to the transceiver, which is configured to transmit system information including an indicator supporting a type 2 UE, transmit, from a UE, an RRCSetupRequest message including type 1 capability information of the UE, determine whether the UE is a type 2 UE, based on the RRCSetupRequest message, transmit, to the UE, a result of the determining and an RRCSetup message corresponding to the type 1 capability information, receive, from the UE, type 3 UE capability information of the UE in an RRCSetupComplete message in response to the RRCSetup message, transmit, to an access management function (AMF), a message for registration request included in a non-access stratum (NAS) container in the RRCSetupComplete message, perform an authentication procedure with the AMF, receive a UE capability enquiry message to the UE, and receive at least one of the type 1 capability information, type 2 capability information and type 3 capability information of the UE from the UE in response to the UE capability enquiry message.

<center>MODE FOR INVENTION</center>

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It will be understood that each block and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Descriptions of some well-known technologies that possibly obscure the disclosure will be omitted, if necessary. Embodiments of the disclosure will now be described with reference to accompanying drawings.

Herein, terms to identify access nodes, terms to refer to network entities, terms to refer to messages, terms to refer to interfaces among network entities, terms to refer to various types of identification information, etc., are examples for convenience of explanation. Accordingly, the disclosure is not limited to the terms as herein used, and may use different terms to refer to the items having the same meaning in a technological sense.

Some of the terms and names defined by the 3rd generation partnership project (3GPP) long term evolution (LTE) will be used hereinafter. The disclosure is not, however, limited to the terms and definitions, and may equally apply to any systems that conform to other standards. In the disclosure, eNode B (eNB) may be interchangeably used with gNode B (gNB). For example, a base station referred to as an eNB may also indicate a gNB. Furthermore, the term 'terminal' or 'user equipment (UE)' may refer not only to a cell phone, an NB-IoT device, and a sensor but also to other wireless communication devices.

In the following description, a base station is an entity for performing resource allocation for a terminal, and may be at least one of a gNB, an eNB, a Node B, a base station (BS), a radio access unit, a base station controller, or a network node. The terminal may include a user equipment (UE), a mobile station (MS), a cellular phone, a smart phone, a computer, or a multimedia system capable of performing a communication function. It is, of course, not limited thereto.

Especially, the disclosure may be applied to the 3GPP new radio (NR) (which is the 5G mobile communication standard). The disclosure may be applied to intelligent services based on the 5G communication and IoT related technologies, e.g., smart homes, smart buildings, smart cities, smart cars, connected cars, health care, digital education, smart retail, and security and safety services. In the disclosure, eNB may be interchangeably used with gNB. For example, a base station referred to as an eNB may also indicate a gNB. Furthermore, the term 'terminal' or 'user equipment (UE)' may refer not only to a cell phone, an NB-IoT device, and a sensor but also to other wireless communication devices.

Wireless communication systems are evolving from early systems that provide voice-oriented services to broadband wireless communication systems that provide high data rate and high-quality packet data services such as 3GPP high speed packet access (HSPA), long term evolution (LTE) or evolved universal terrestrial radio access (E-UTRA), LTE-advanced (LTE-A), LTE-Pro, 3GPP2 high rate packet data (HRPD), ultra mobile broadband (UMB), and IEEE 802.16e communication standards.

As a representative example of such a broadband wireless communication system, an LTE system adopts orthogonal frequency division multiplexing (OFDM) for a downlink (DL) and single carrier frequency division multiple access (SC-FDMA) for an uplink (UL). The UL refers to a radio link for a UE or MS to send data or a control signal to an eNode B or BS, and the DL refers to a radio link for a BS to send data or a control signal to a UE or MS. Such a multiple access scheme allocates and operates time-frequency resources for carrying data or control information for respective users not to overlap each other, i.e., to maintain orthogonality, thereby differentiating each user's data or control information.

As a future communication system after the LTE, the 5G communication system needs to freely reflect various demands from users and service providers and thus support services that simultaneously meet the various demands. The services considered for the 5G communication system may include enhanced Mobile Broadband (eMBB), massive Machine Type Communication (mMTC), Ultra Reliability Low Latency Communication (URLL), etc.

In some embodiments, the eMBB is aimed at providing more enhanced data rates than the LTE, LTE-A or LTE-Pro may support. For example, in the 5G communication system, the eMBB is required to provide 20 Gbps peak data rate in DL and 10 Gbps peak data rate in UL in terms of a single BS. Furthermore, the 5G communication system may need to provide an increasing user perceived data rate while providing the peak data rate. To satisfy these requirements, enhancement of various technologies for transmission or reception including multiple-input multiple-output (MIMO) transmission technologies may be required in the 5G communication system. While the present LTE uses up to 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

At the same time, in the 5G communication system, mMTC is considered to support an application service such as an Internet of Things (IoT) application service. In order for the mMTC to provide the IoT efficiently, support for access from massive number of terminals in a cell, enhanced coverage of the terminal, extended battery time, cost reduction in terminal, etc., may be required. Because the IoT is equipped in various sensors and devices to provide communication functions, it may be supposed to support a large number of UEs in a cell (e.g., 1,000,000 terminals/km$^2$). Furthermore, a UE supporting the mMTC is more likely to be located in a shadow area, such as a basement of a building, which might not be covered by a cell due to the nature of the service, so the mMTC may require an even larger coverage than expected for other services provided by the 5G communication system. The UE supporting the mMTC needs to be a low-cost terminal, and may require quite a long battery life time such as 10 to 15 years because it is difficult to frequently change the battery in the UE.

Finally, the URLLC may be a mission-critical cellular based wireless communication service, which may be used for services used for remote control over robots or machinery, industrial automation, unmanned aerial vehicle, remote health care, emergency alert, etc. Accordingly, communication offered by the URLLC may require very low latency (ultra low latency) and very high reliability (ultra high reliability). For example, URLCC services may need to satisfy sub-millisecond (less than 0.5 millisecond) air interface latency and simultaneously require a packet error rate equal to or lower than 10$^{-5}$. Hence, for the URLLC services, the 5G system needs to provide a smaller transmit time interval (TTI) than for other services, and simultaneously requires a design that allocates a wide range of resources for a frequency band to secure reliability of the communication link.

Those three services considered in the aforementioned 5G communication system, i.e., eMBB, URLLC, and mMTC, may be multiplexed and transmitted from a single system. In this case, to meet different requirements for the three services, different transmission or reception schemes and parameters may be used between the services. The mMTC, URLLC, and eMBB are an example of different types of services, and embodiments of the disclosure are not limited to the service types.

Although the following embodiments of the disclosure will now be focused on an LTE, LTE-A, LTE Pro or 5G (or NR, next generation mobile communication) system for example, they may be equally applied to other communication systems with similar technical backgrounds or channel types. Furthermore, embodiments of the disclosure will also be applied to different communication systems with some modifications to such an extent that they do not significantly deviate from the scope of the disclosure when judged by those of ordinary skill in the art.

Operating principles of embodiments of the present disclosure will now be described with reference to accompanying drawings. Detailed description of related well-known functions or features, which might obscure the gist of the disclosure, will be omitted in describing the following embodiments of the disclosure. Further, the terms, as will be mentioned later, are defined by taking functionalities in the disclosure into account, but may vary depending on practices or intentions of users or operators. Accordingly, the terms should be defined based on descriptions throughout this specification. Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

In the disclosure, in relation to a series of processes in which a UE receives, from a BS, a request for UE capability information and provides the report in an NR system, provided is a method by which a lower complexity UE reports the UE capability in a different manner unlike the existing procedure. This is a method of addressing a need to deliver UE capability to the BS while the UE is attempting to connect to the BS.

In the disclosure, with the method by which the low complexity UE reports its capability information in the NR system, the UE capability may be delivered to the BS before being in the RRC connected state, enabling the UE to determine whether to connect to the UE and fast support for the UE.

FIG. 1A illustrates a structure of an LTE system, according to an embodiment of the disclosure.

Referring to FIG. 1A, a radio access network of the LTE system includes evolved Node Bs (hereinafter, also referred to as eNBs, Node Bs, or base stations (BSs)) 1*a*-05, 1*a*-10, 1*a*-15, and 1*a*-20, a Mobility Management Entity (MME) 1*a*-25, and a Serving Gateway (S-GW) 1*a*-30. A UE (user equipment or terminal) 1*a*-35 accesses an external network via the eNB 1*a*-05 to 1*a*-20, and the S-GW 1*a*-30.

In FIG. 1A, the eNBs 1*a*-05 to 1*a*-20 may correspond to the existing node Bs in a universal mobile telecommunication system (UMTS). The eNB may be connected to the UE 1*a*-35 via a wireless channel, and may play a more sophisticated role than the existing node B does. In the LTE system, all user traffic including real time services such as voice over Internet protocol (VoIP) services through an Internet protocol is served on a shared channel, so a device for collecting state information, such as buffer states, available transmit power states, channel states, etc., of UEs for scheduling is required, and the eNBs 1*a*-05 to 1*a*-20 serves as the device. A single eNB may generally control a plurality of cells. To achieve e.g., 100 Mbps of transmission speed, the LTE system may use Orthogonal Frequency Division Multiplexing (OFDM) in e.g., 20 MHz of bandwidth as a radio access technology. It is sure that the radio access technology that may be used by the LTE system is not limited to the above example. Furthermore, the eNB 1*a*-05 to 1*a*-20 may use an adaptive modulation and coding (AMC) scheme that determines a modulation scheme and a channel coding rate according to the channel condition of the UE. The S-GW 1*a*-30 is a device to provide a data bearer, producing or eliminating the data bearer under the control of the MME 1*a*-25. The MME is a device responsible for various control functions as well as a mobility management function for the UE, and may be connected to a plurality of BSs.

Figure 1B:
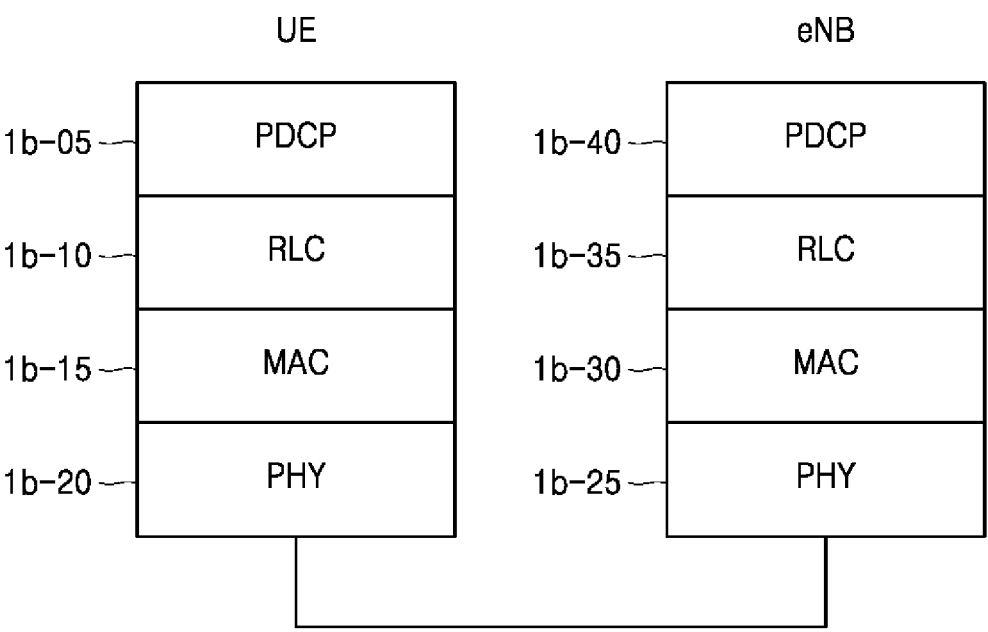
FIG. 1B illustrates a radio protocol architecture of an LTE system, according to an embodiment of the disclosure.

FIG. 1B illustrates a radio protocol architecture of an LTE system, according to an embodiment of the disclosure.

Referring to FIG. 1B, a radio protocol of the LTE system may include in each of a UE and an eNB, a packet data convergence protocol (PDCP) layer 1*b*-05 or 1*b*-40, a radio link control (RLC) layer 1*b*-10 or 1*b*-35, a medium access control (MAC) layer 1*b*-15 or 1*b*-30 and a physical (PHY) layer. The PDCP layer 1*b*-05 or 1*b*-40 may perform operation such as IP header compression/restoration. Main functions of the PDCP layer may be summarized as follows: It is, of course, not limited to the following example.

header compression and decompression function (e.g., header compression and decompression: robust header compression (ROHC) only)

user data transfer sequential delivery function (e.g., in-sequence delivery of higher layer Packet Data Units (PDUs) at PDCP re-establishment procedure for RLC acknowledged mode (AM))

reordering function (e.g., for split bearers in DC (only support for RLC AM): PDCP PDU routing for transmission and PDCP PDU reordering for reception)

duplicate detection function (e.g., duplicate detection of lower layer SDUs at PDCP re-establishment procedure for RLC AM)

retransmission function (e.g., retransmission of PDCP SDUs at handover and, for split bearers in DC, of PDCP PDUs at PDCP data-recovery procedure, for RLC AM)

ciphering and deciphering timer-based SDU discarding (e.g., timer-based SDU discarding in uplink)

The RLC 1*b*-10 and 1*b*-35 may reconfigure a PDCP PDU to be in a proper size, and perform operation, such as Automatic Repeat reQuest (ARQ). Main functions of the RLC layer may be summarized as follows: It is, of course, not limited to the following example.

data transfer (e.g., transfer of higher layer PDUs)

ARQ function (e.g., Error Correction through ARQ (only for AM data transfer))

concatenation, segmentation, and reassembling function (e.g., concatenation, segmentation and reassembly of RLC SDUs (only for UM and AM data transfer))

re-segmentation function (e.g., re-segmentation of RLC data PDUs (only for AM data transfer))

reordering function (e.g., reordering of RLC data PDUs (only for UM and AM data transfer))

duplicate detection function (e.g., duplicate detection (only for UM and AM data transfer))

error detection function (e.g., protocol error detection (only for AM data transfer))

RLC SDU discard function (e.g., RLC SDU discard (only for UM and AM data transfer))

RLC re-establishment

The MAC layer 1*b*-15 and 1*b*-30 may be connected to various RLC layer devices configured in a terminal, and may multiplex RLC PDUs to an MAC PDU and demultiplex an MAC PDU to RLC PDUs. Main functions of the MAC layer may be summarized as follows: Functions of the MAC layer is not limited to the following examples.

mapping function (e.g., mapping between logical channels and transport channels)

multiplexing and demultiplexing functions (e.g., multiplexing/demultiplexing of MAC SDUs belonging to one or different logical channels into/from transport blocks (TB) delivered to/from the physical layer on transport channels)

scheduling information report function

HARQ function (e.g., error correction through HARQ)

logical channel priority control function (e.g., priority handling between logical channels of one UE)

UE priority control function (e.g., priority handling between UEs by means of dynamic scheduling)

MBMS service identification function transport format selection function padding function A physical layer (PHY layer) 1*b*-20 or 1*b*-25 may encode and modulate higher layer data into OFDM symbols and transmit them on a radio channel, or may demodulate OFDM symbols received on a radio channel, perform channel decoding on them and send the result to a higher layer. Furthermore, even the PHY layer may use a hybrid automatic repeat request (HARQ) for additional error correction, and a receiving end may transmit whether a packet has been received from a transmitting end in one bit. This is called HARQ ACK/NACK information. DL HARQ ACK/NACK information for UL transmission may be transmitted on a physical hybrid-ARQ indicator channel (PHICH) physical channel, and UL HARQ ACK/NACK information for DL transmission may be transmitted on a physical uplink control channel (PUCCH) or a physical uplink shared channel (PUSCH).

The PHY layer may be configured to use one or multiple frequencies/carriers, and a technology that allocates and uses multiple frequencies simultaneously may be referred to as carrier aggregation (CA). With the use of the CA technology, for communication between a UE and a BS (E-UTRAN NodeB or eNB), a primary carrier and additional one or multiple secondary carriers may be used to dramatically increase an amount of transmission by the number of the secondary carriers. In the meantime, in LTE, a cell in a BS which uses the primary carrier or the secondary carrier is called a primary cell (PCell) or a secondary cell (SCell).

Although not shown, there may be radio resource control (RRC) layers above the PDCP layers of the UE and the BS, and the RRC layers may exchange settings control messages related to access and measurement for radio resource control.

Figure 1C:
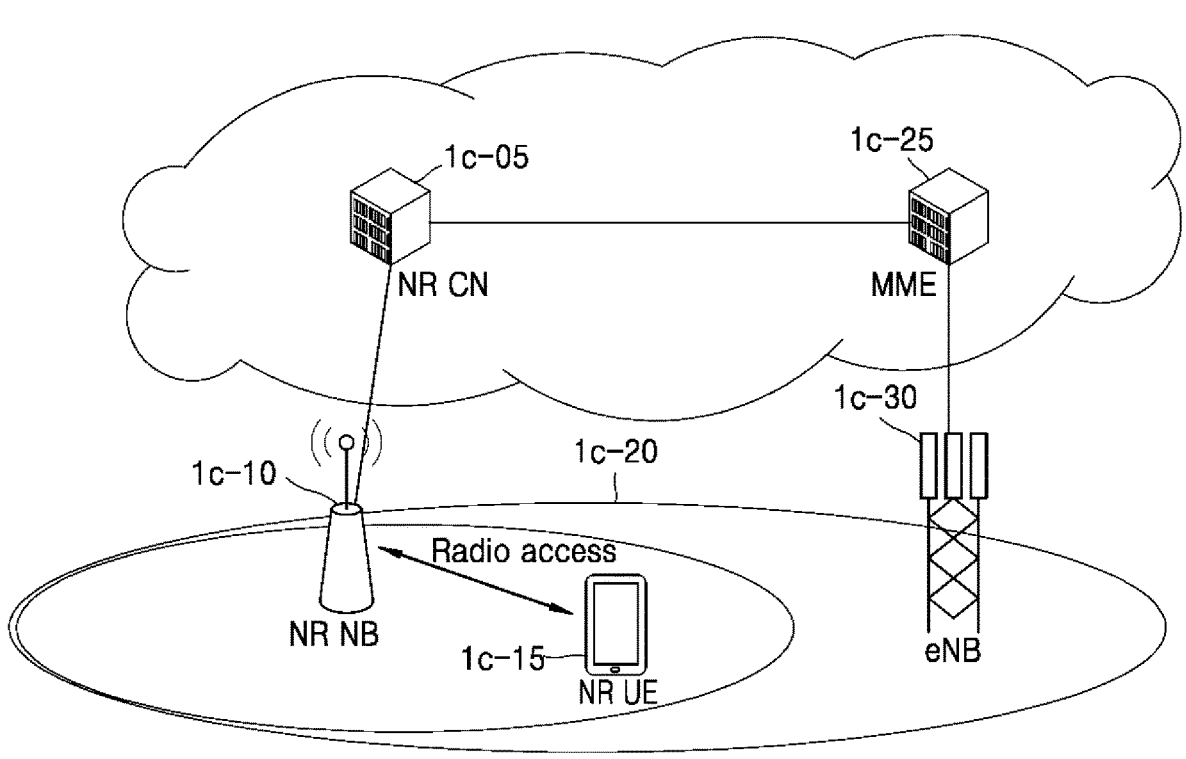
FIG. 1C illustrates a structure of a next generation mobile communication system, according to an embodiment of the disclosure.

FIG. 1C illustrates a structure of a next generation mobile communication system, according to an embodiment of the disclosure.

Referring to FIG. 1C, a wireless access network of the next generation mobile communication system includes a new radio node B (NR NB, NR gNB, gNB or NR BS) 1c-10, and a new radio core network (NR CN) or next generation core network (NG CN) 1c-05. A new radio user equipment (NR UE or terminal) 1c-15 accesses an external network through the NR NB 1c-10 and the NR CN 1c-05.

In FIG. 1C, the NR NB 1c-10 corresponds to an evolved Node B (eNB) of the existing LTE system. The NR NB 1c-10 may be connected to the NR UE 1c-15 on a radio channel, and may provide much better services than the existing node B does. In the next generation mobile communication system, all user traffic may be served on a shared channel, so a device to collect status information, such as buffer status of UEs, available transmission power status, channel condition, etc., for scheduling is required, and the NR NB 1c-10 may serve as the device. A single NR NB may generally control a plurality of cells. According to an embodiment of the disclosure, the next generation mobile communication system may have more than the existing maximum bandwidth to attain ultrahigh speed data transfer as compared to the existing LTE, and an additional beam-forming technology may be used with the OFDM radio access technology. Furthermore, the NR NB 1c-10 may use an adaptive modulation and coding (AMC) scheme that determines a modulation scheme and a channel coding rate according to the channel condition of the UE. The NR CN 1c-05 may perform such functions as supporting mobility, setting up a bearer, setting quality of service (QoS), etc. The NR CN 1c-05 is a device responsible for various control functions as well as mobility management functionality for the UE, and may be connected to a plurality of BSs. Furthermore, the next generation mobile communication system may work with the existing LTE system, in which case the NR CN 1c-05 is connected to an MME 1c-25 through a network interface. The MME is connected to an existing BS, eNB 1c-30.

Figure 1D:
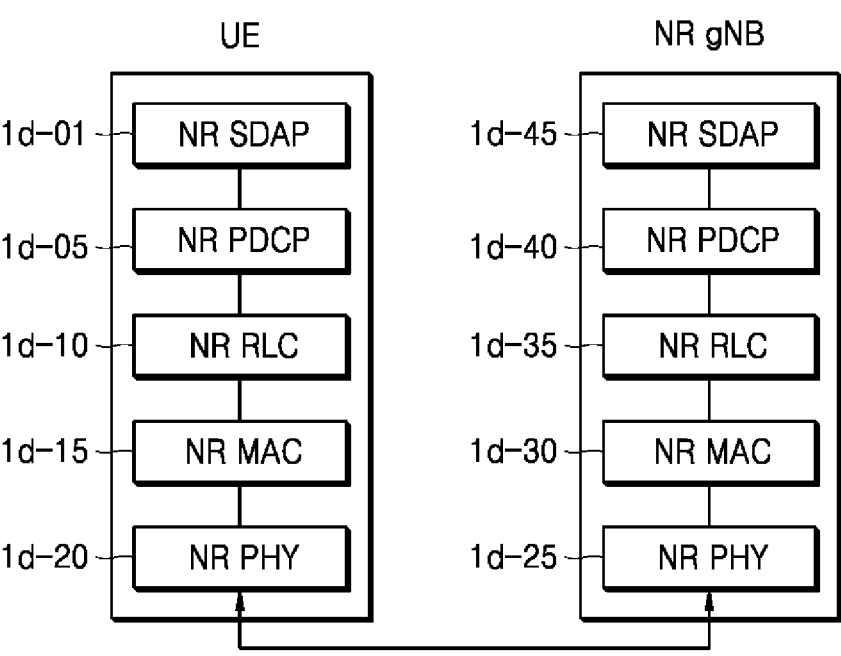
FIG. 1D illustrates a radio protocol architecture of a next generation mobile communication system, according to an embodiment of the disclosure.

FIG. 1D illustrates a radio protocol architecture of a next generation mobile communication system, according to an embodiment of the disclosure.

Referring to FIG. 1D, a radio protocol of a next generation mobile communication system in each of a UE and an NR BS may include an NR service data adaptation protocol (NR SDAP) 1d-01 or 1d-45, an NR packet data convergence protocol (NR PDCP) 1d-05 or 1d-40, an NR radio link control (NR RLC)) 1d-10 or 1d-35, an NR medium access control (NR MAC)) 1d-15 or 1d-30 and an NR PHY layer.

In an embodiment of the disclosure, main functions of the NR SDAP 1d-01 or 1d-45 may include some of the following functions: It is, of course, not limited to the following example.
    transfer of user plane data
    function of mapping between a QoS flow and a data bearer (DRB) for both DL and UL
    marking a QoS flow identity (ID) for both UL and DL packets mapping of a reflective QoS flow to a DRB for UL SDAP PDUs.

For the SDAP layer device, the UE may receive configuration of whether to use a header of the SDAP layer device or whether to use a function of the SADP layer device for each PDCP layer device or each bearer or each logical channel in a radio resource control (RRC) message. When the SDAP header is configured, the BS or the UE may indicate a 1-bit non-access stratum (NAS) reflective QoS indicator (NAS reflective QoS) and a 1-bit access stratum (AS) reflective QoS (AS reflective QoS) for the UE to update or reconfigure the mapping information between the QoS flow and the data bearer for UL or DL. In an embodiment of the disclosure, the SDAP header may include QoS flow ID information indicating QoS. Furthermore, in an embodiment of the disclosure, the QoS information may be used for data process priority, scheduling, etc., to support smoother services.

In an embodiment of the disclosure, main functions of the NR PDCP 1d-05 or 1d-40 may include some of the following functions: It is, of course, not limited to the following example.
    header compression and decompression function (e.g., header compression and decompression: ROHC only)
    user data transfer function
    sequential delivery function (e.g., in-sequence delivery of higher layer PDUs)
    non-sequential delivery function (e.g., out-of-sequence delivery of higher layer PDUs)
    reordering function (e.g., PDCP PDU reordering for reception)
    duplicate detection function (e.g., duplicate detection of lower layer SDUs)
    retransmission function (e.g., retransmission of PDCP SDUs)
    ciphering and deciphering function
    timer-based SDU discarding function (e.g., timer-based SDU discarding in uplink)

According to an embodiment of the disclosure, the reordering function of the NR PDCP device may refer to a function of reordering PDCP PDUs received from a lower layer based on PDCP sequence numbers (SNs), the reordering function of the NR PDCP device may include at least one of a function of transferring data to a higher layer in the reordered sequence or transferring the data directly to the higher layer without considering the sequence, a function of reordering the sequence to record missing PDCP PDUs, a function of reporting status of missing PDCP PDUs to a transmitting end, or a function of requesting retransmission of missing PDCP PDUs.

In an embodiment of the disclosure, main functions of the NR RLC 1d-10 or 1d-35 may include some of the following functions: It is, of course, not limited to the following example.
    data transfer function (e.g., transfer of higher layer PDUs)
    sequential delivery function (e.g., in-sequence delivery of higher layer PDUs)
    non-sequential delivery function (e.g., out-of-sequence delivery of higher layer PDUs)
    ARQ function (e.g., error correction through ARQ)
      concatenation, segmentation, and reassembling function (e.g., concatenation, segmentation and reassembly of RLC SDUs)
    re-segmentation function (e.g., re-segmentation of RLC data PDUs)
    reordering function (e.g., reordering of RLC data PDUs)
    duplicate detection function error detection function (e.g., protocol error detection)

RLC SDU discard function

RLC re-establishment function

The sequential delivery function (in-sequence delivery) of the NR RLC device may refer to a function of delivering RLC SDUs received from a lower layer to a higher layer in sequence. The sequential delivery function of the NR RLC device may include at least one of a function of receiving, reassembling and delivering multiple RLC SDUs resulting from segmentation of one RLC SDU, a function of reordering the received RLC PDUs based on RLC SNs or PDCP SNs, a function of reordering the sequence to record missing RLC PDUs, a function of reporting status of missing RLC PDUs to a transmitting end, a function of requesting retransmission of missing PDCP PDUs, a function, when there is a missing RLC SDU, of delivering RLC SDUs before the missing RLC SDU to a higher layer in sequence, a function, when there is a missing RLC SDU but a timer is expired, of delivering all RLC SDUs received before the timer starts to a higher layer in sequence, and a function, when there is a missing RLC SDU but a timer is expired, of delivering all RLC SDUs received up to present to a higher layer in sequence.

Furthermore, in an embodiment of the disclosure, the NR RLC layer may also process the RLC PDUs in the order of reception (or in the order of arrival without regard to the order of the SNs) and deliver the RLC PDUs to a PDCP device regardless of the sequence (out-of-sequence delivery), or when the RLC PDU is segmented, reassemble the segments stored in a buffer or to be received later into a complete RLC PDU, process and deliver the RLC PDU to the PDCP device. The NR RLC layer may not include the concatenation function, and the concatenation function may be performed in the NR MAC layer or replaced with the multiplexing function of the NR MAC layer.

In an embodiment of the disclosure, the non-sequential delivery function of the RLC device may refer to a function of delivering RLC SDUs received from a lower layer directly to a higher layer without regard to the sequence of the RLC SDUs, and include at least one of a function of receiving and reassembling multiple RLC SDUs resulting from segmentation of an original RLC SDU and delivering the reassembled RLC SDUs, and a function of storing RLC SNs or PDCP SNs of the received RLC PDUs and reordering the received RLC PDUs to record missing RLC PDUs.

In an embodiment of the disclosure, the NR MAC 1*d*-15 or 1*d*-30 may be connected to multiple NR RLC layer devices configured in the same UE, and main functions of the NR MAC may include some of the following functions: It is, of course, not limited to the following example.

mapping function (e.g., mapping between logical channels and transport channels)

multiplexing and demultiplexing function (e.g., multiplexing/demultiplexing of MAC SDUs)

scheduling information report function

HARQ function (e.g., error correction through HARQ)

logical channel priority control (e.g., priority handling between logical channels of one UE)

UE priority control function (e.g., priority handling between UEs by means of dynamic scheduling)

MBMS service identification function transport format selection function padding function According to an embodiment of the disclosure, the NR PHY layer 1*d*-20 or 1*d*-25 may perform channel coding and modulation on higher layer data, form the data into OFDM symbols and send them on a radio channel, or may demodulate OFDM symbols received on a radio channel, perform channel decoding on them and send the result to a higher layer. Operations of the NR PHY layer are not limited to the examples.

Figure 1E:
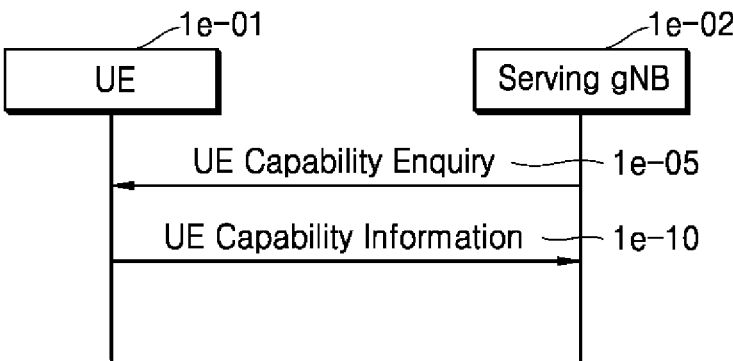
FIG. 1E illustrates a message structure for reporting user equipment (UE) capability in a new radio (NR) system, according to an embodiment of the disclosure.

FIG. 1E illustrates a message structure for reporting UE capability in an NR system, according to an embodiment of the disclosure.

According to an embodiment of the disclosure, a UE 1*e*-01 connected to a serving eNB 1*e*-02 may perform a procedure for reporting information about a capability supported by the UE to the serving gNB 1*e*-02. In operation 1*e*-05, the BS transmits a UE capability enquiry message requesting the UE connected to the BS to report capability information. In an embodiment of the disclosure, the UE capability enquiry message may include a UE capability request of the BS for each RAT type. Furthermore, in an embodiment of the disclosure, the request for each RAT type may include requested frequency band information according to priorities.

Moreover, in an embodiment of the disclosure, the UE capability enquiry message may request multiple RAT types in one RRC message container, or a UE capability enquiry message including a request for each RAT type may be included and sent to the UE multiple times. Specifically, in operation 1*e*-05, the UE capability enquiry message may be repeated multiple times, and the UE may compose a UE capability information message in response to the UE capability enquiry message, and match and report the response to the request. In the next generation mobile communication system, UE capability information for NR, LTE, evolved-universal terrestrial radio access new radio dual connectivity (EN-DC), and multi-radio dual connectivity (MR-DC) may be requested. Furthermore, in an embodiment of the disclosure, it is common to initially transmit the UE capability enquiry message after the UE is connected, but the UE capability enquiry message may be requested in any condition whenever needed by the BS.

Upon receiving a request to report the UE capability information from the BS in operation 1*e*-05, the UE composes UE capability information according to a RAT type and frequency band information requested from the BS. How the UE composes the UE capability information in an NR system is as follows: It is, of course, not limited thereto.

1. The UE may receive a request for some or all of RAT types of LTE, MR-DC and NR in the UE capability information request, and simultaneously, a list of LTE and NR frequency bands from the BS. The UE compiles a band combination (BC) of MR-DC and NR standalone (SA). Specifically, a candidate BC list for the MR-DC and NR SA based on the frequency bands requested from the BS in FreqBandList is compiled. Compiling the candidate BC list for the MR-DC and NR SA may be defined as an operation of compiling a candidate band combination. Priorities of the bands may be set in the order of being listed in FreqBandList. The compiling of the candidate BC may be performed once regardless of the RAT type or may be performed repeatedly for each RAT type.

In the following operations, a procedure corresponding to each RAT type is performed, in which case priorities are given in the order of NR, MR-DC and LTE.

2. When a "eutra-nr-only" flag or a "eutra" flag is set for the RAT type of the UE capability request message, things about NR SA BCs may be totally discarded from the compiled candidate BC list. This may happen only when an LTE eNB requests a "eutra" capability.

3. Subsequently, the UE may discard fallback BCs from the candidate BC list compiled in the operation of compiling the candidate BC list. The fallback BC may refer to a super set BC from which a band corresponding to at least one SCell is eliminated, and may be omitted because the super set BC may already cover the fallback BC. The eliminating of the fallback BC from the candidate BC list may be applied even for MR-DC, i.e., LTE bands are also applied. BCs left after the operation of eliminating fallback BCs from the candidate BC list may be a final "candidate BC list".

4. The UE may select BCs to be reported by selecting BCs that suit the requested RAT type from the final "candidate BC list". In the operation of selecting BCs to be reported, the UE may compile supportedBandCombinationList in a set order. Specifically, the UE may compile BCs and UE capability to be reported in a preset RAT type order. (nr→eutra-nr→eutra). Furthermore, featureSetCombination for the compiled supportedBandCombinationList may be compiled, and a "candidate feature set combination" list from the candidate BC list from which a list of the fallback BCs (including equal or low-level capability) is discarded may be compiled. The "candidate feature set combinations" include all feature set combinations for NR and EUTRA-NR BCs, and may be obtained from feature set combinations of UE-NR-Capabilities and UE-MRDC-Capabilities containers.

5. Furthermore, when the requested RAT type is eutra-nr, which affects supportedBandCombination of EN-DC or MR-DC, featureSetCombinations is configured according to the associated RAT type and is all be included in two containers of UE-MRDC-Capabilities and UE-NR-Capabilities. However, NR feature sets exclusively include UE-NR-Capabilities.

After the UE capability is configured, the UE provides and transmits a UE capability information message including the UE capability information to the BS, in operation 1e-10. The BS may then perform scheduling and transmis-sion or reception management suitable for the UE, based on the UE capability information received from the UE.

Figure 1F:
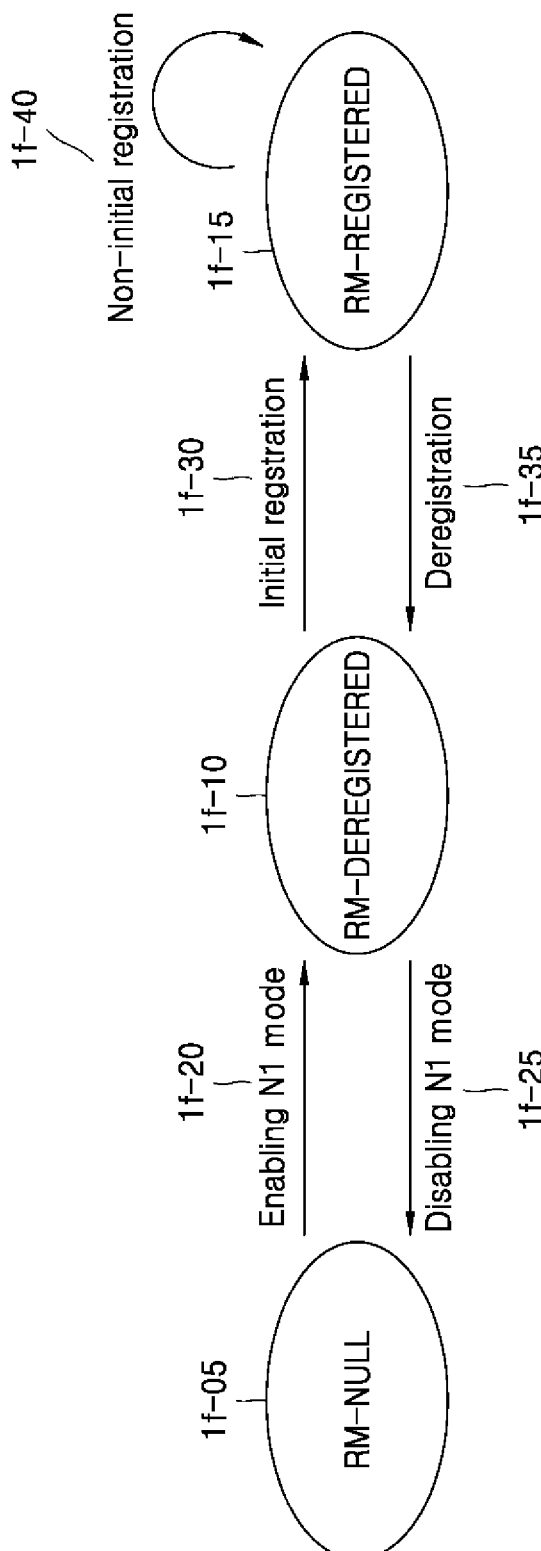
FIG. 1F is a diagram for describing a state of a UE in an NR system registering to and unregistering from a fifth generation (5G) core network, according to an embodiment of the disclosure.

FIG. 1F is a diagram for describing a state of a UE in an NR system registering to and unregistering from a 5G core network, according to an embodiment of the disclosure.

In an embodiment of the disclosure, the UE is in a registration management (RM)-NULL state as in operation 1f-05 until initially registered to a core network in the NR system. Subsequently, when N1 mode (a mode to be con-nected to the 5G core network) is enabled in the UE in operation 1f-20, the UE is in an RM-DEREGISTRATION state for the 5G core network as in operation 1f-10. In other words, the RM-DEREGISTRATION state of operation 1f-10 may refer to a state in which the UE is able to access the 5G core network but has not yet finished the access and registration procedure. The UE in the RM-DEREGISTRA-TION state of operation 1f-10 attempts an initial access and registration procedure with the 5G core network in operation 1f-30, and when operation 1f-30 is completed, the UE is switched into an RM-REGISTRATION state in operation 1f-15. Afterwards, even when the UE performs a procedure such as changing a serving cell, it is not the initial registra-tion process of operation 1f-40 so that the UE remains in the RM-REGISTRATION state of operation 1f-15. When dereg-istered in operation 1f-35, the UE is switched back into the RM-DEREGISTRATION state of operation 1f-10, and when the N1 mode is disabled in the RM-DEREGISTRATION state of operation 1f-10 in operation 1f-25, the UE is switched into the RM-NULL state of operation 1f-05.

In the disclosure, proposed are new methods of delivering UE capability of a lower complexity UE (tentatively called an NR light UE) than the existing NR UE. Overall descrip-tions of UE capabilities to be reported by the low complexity NR UE and how to deliver the UE capabilities are summa-rized in Table below. It is, of course, not limited to the following example.

TABLE 1

| Composition of UE capability information of the low complexity NR UE | | | | |
|---|---|---|---|---|
| UE capability types | Report types | Msg 3 report | Msg 5 report | UE capability message report |
| Support of INACTIVE WakeUpSignal | Type 2 | | | Y; explicit & precise |
| Support of IDLE WakeUpSignal | Type 3 | | | |
| Maximum data rate | Type 1-1 | Y; explicit & rough | | Y; implicit & precise |
| Maximum bandwidth | Type 1-2 | Y; explicit & rough | | Y; explicit & precise |
| Number of Tx/Rx antennas | Type 1-2 | Y; explicit & rough | | Y; explicit & precise |
| Security | Type 3 | | Y; explicit & precise | |
| Location | Type 3 | | Y; explicit & precise | |
| Layer 2 buffer size | Type 1-1 | Y; explicit & rough | | Y; implicit & precise |
| Tx power | Type 1-2 | Y; explicit & rough | | Y; explicit & precise |
| Supported band list | Type 2 | | | Y; explicit & precise |

In Table 1, how to report types of UE capability to be newly reported and information and methods of reporting the capability in relation to the composition of the UE capability information of the low complexity NR UE is described.

1. UE capability information: A list of UE capabilities to be reported by the lower complexity NR UE differently from capabilities reported by the existing NR UEs 2. Report types A. Type 1 report: Rough information (information indicating a capability approximate to an actual UE capability) and precise information (actual UE information) are reported separately.

i. The rough information is reported in Msg 3 (RRCSetupRequest, RRCResumeRequest), and always reported even without being requested by the BS.

ii. The precise information is reported when requested by the BS. (A UE capability delivery procedure in the existing NR is used. UE capability enquiry, UE capability information procedure, see FIG. 1E)

iii. In type 1-1, the rough information is explicitly reported and the precise information is implicitly reported (the implicit reporting means that a different value is reported instead of direct signaling of the corresponding information, allowing an actual value to be inferred).

iv. In type 1-2, both the rough information and the precise information are explicitly reported B. Type 2 report i. Only the precise information is reported when requested by the BS.

C. Type 3 report i. Only the precise information is reported in Msg 5 (RRCSetupComplete, RRCResumeComplete) regardless of whether requested by the BS. Whether to report is determined depending on the type of a control message contained in Msg 5.

ii. In type 3, report is made in an NAS container (DedicatedNAS-Message) of an RRC message, which is transparent to the BS and information of which is analyzed by an AMF.

when a registration request is contained in the container, whether to support LTE positioning protocol (LPP) (24.501 FIG. 9.11.3.1.1) and UE security capability (24.501 table 8.2.6.1.1) are reported.

For example, in reporting the UE capabilities of Table 1, the UE may set a logical channel ID (LCID) of the msg 3 to a suitable value or indicate that the UE is a low complexity NR UE in information of a bit added to the msg 3. Furthermore, type 1-1/type 1-2 UE capability information may be delivered in the msg 3. Afterwards, when an NAS container including a type 3 UE capability is delivered in msg 5, the capability information may be delivered to an AMF. Type 2 UE capability information may use the existing UE capability procedure intactly. The whole procedure and UE operations will now be described in detail in the following embodiments of the disclosure.

Furthermore, hereinafter, following definitions of a type 1 UE and type 2 UE are used.

type 1 UE: a normal NR UE type 2 UE: a UE having a limited bandwidth, a limited data rate, a smaller number of Tx/Rx antennas (a low complexity NR UE, tentatively called an NR light UE) as compared to the type 1 UE.

Figure 1G:
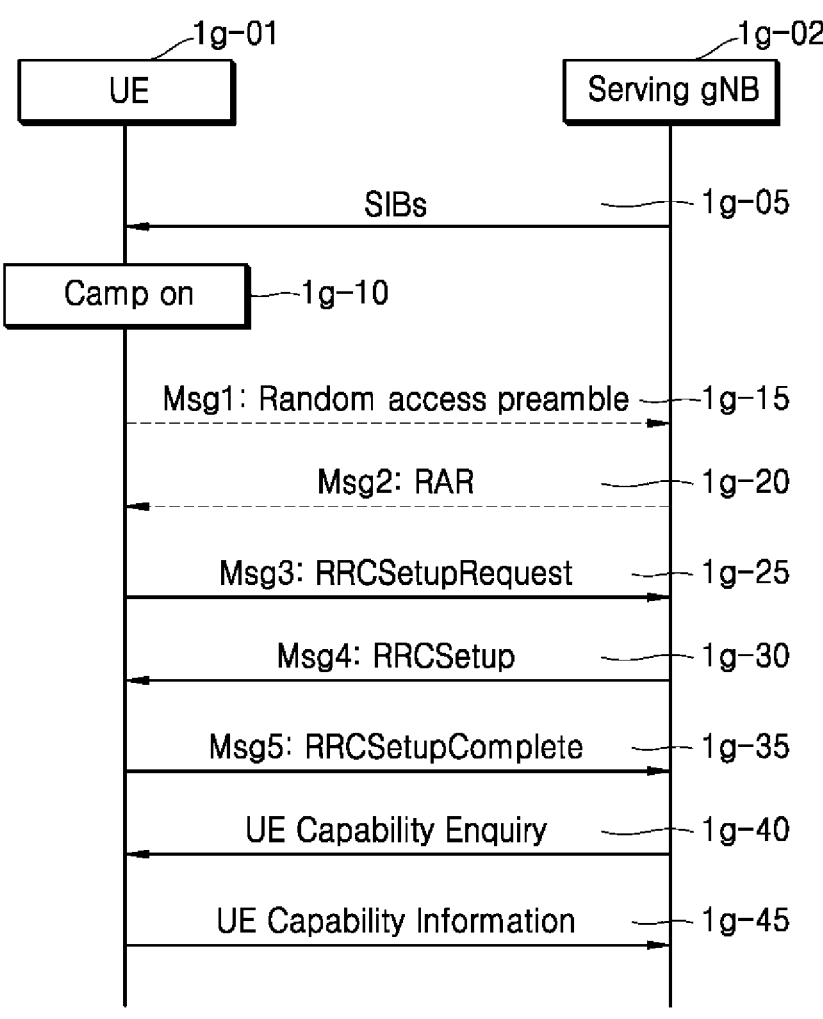
FIG. 1G illustrates an entire procedure for reporting UE capability of a type 2 UE (tentatively named NR light UE), according to an embodiment of the disclosure.

FIG. 1G illustrates an entire procedure for reporting UE capability of a type 2 UE (tentatively named NR light UE), according to an embodiment of the disclosure.

In an embodiment of the disclosure, the type 2 UE in an RRC IDLE state, 1g-01, may camp on a cell in operation 1g-10. Specifically, when the UE 1g-01 receives system information from a gNB 1g-02 of a cell and the cell is a serving cell that supports the type 2 UE, the type 2 UE 1g-01 may camp on the cell in operation 1g-10. More specifically, the type 2 UE 1g-01 may check the SIB1 for an indicator indicating whether the type 2 UE is supported and camp on the cell in operation 1g-10. Furthermore, the UE 1g-01 may initiate an RRC connection setup procedure for performing a registration procedure, and start an RRC connection procedure for the serving cell. As the maximum bandwidth and data rate supported by the type 2 UE 1g-01 in particular, may be smaller and lower than those of the normal NR UE (type 1 UE), the BS 1g-02 may be required to perform a procedure for determining what type of UE the UE is from an initial RRC connection process. In an embodiment of the disclosure, the normal NR UE (type 1 UE) needs to support a bandwidth of 100 Mbytes, but the type 2 UE may support a much smaller bandwidth (e.g., 10 Mbytes).

In an embodiment of the disclosure, to attempt RRC connection to the cell, the type 2 UE 1g-01 may try random access (RRC connection establishment), and transmit the msg1, i.e., a random access preamble, to the cell in operation 1g-15. In an embodiment of the disclosure, transmission of the random access preamble may be based on preamble configuration information received in SIB1 of the cell.

In operation 1g-20, the UE 1g-01 may receive the msg 2, i.e., a random access response (RAR), from the BS 1g-02. The RAR provides UL resource information to transmit the msg 3, and in operation 1g-25, the UE 1g-01 transmits the msg 3 (RRCSetupRequest message) to the BS 1g-02. In operation 1g-25, the UE 1g-01 may report type 1 information (type 1-1 rough UE capability and Type 1-2 rough UE capability) by sending a message assigned a particular LCID for RRC connection establishment. Various types of LCID indicating a common control channel (CCCH) service data unit (SDU) may be defined as follows, and the UE may select one of them.

1. First LCID Assignment Method

LCID x: the corresponding MAC SDU is a CCCH SDU and has a size of 56 bits

LCID y: indicates that the corresponding MAC SDU is a CCCH SDU and has a size of 56 bits and that the UE's max transmission power (power class) is equal to or less than x dBm, max data rate is equal to or lower than y bps, supported channel bandwidth is equal to or smaller than z Hz and the number of Rx antennas is equal to or smaller than w. That is, it is used as being dedicated to the LCID of the msg 3 used by the type 2 UE.

LCID z: the corresponding MAC SDU is a CCCH SDU and the CCCH SDU has a size of 72 bits.

2. Second LCID Assignment Method

LCID x: the corresponding MAC SDU is RRCSetupRequest in a CCCH SDU and has a size of 56 bits LCID y: indicates that the corresponding MAC SDU is a CCCH SDU and has a size of 56 bits and that the UE's max transmission power (power class) is equal to or less than x dBm, max data rate is equal to or lower than y bps, supported channel bandwidth is equal to or smaller than z Hz and the number of Rx antennas is equal to or smaller than w. That is, it is used as being dedicated to the LCID of the msg 3 (RRCSetupRequest) used by the type 2 UE.

LCID w: the corresponding MAC SDU is RRCResumeRequest in a CCCH SDU and has a size of 56 bits LCID z: the corresponding MAC SDU is a CCCH SDU and the CCCH SDU has a size of 72 bits.

When the first LCID assignment method is used for the msg 3, the UE in the IDLE mode may select one of the LCID x and the LCID y, and the INACTIVE UE may select one of the LCID x and the LCID z. As the BS is aware of the detailed capacity of the INACTIVE UE so there is no need to inform the rough capacity, there may be no need for an operation of indicating a UE capability such as the LCID y. When the second LCID assignment method is used for the msg 3, the UE in the IDLE mode selects one of the LCID x and the LCID y, and the INACTIVE UE selects one of the LCID w and the LCID z. As the BS is aware of the detailed capacity of the INACTIVE UE so there is no need to inform the rough capacity, there may be no need for an operation of indicating a UE capability such as the LCID y. Alternatively, instead of classification into the LCIDs, one bit may be added to the existing msg to distinguish the type 2 UE.

The UE 1g-01 may receive msg 4 (RRCSetup message) from the BS 1g-02 in operation 1g-30, apply settings in the message, then create msg 5 (RRCSetupComplete message) in operation 1g-35 and send the msg 5 to the BS. Operation 1g-30 in particular may include a method of reporting type 3 information for performing a procedure for requesting registration to a core network (CN). Specifically, a registration request message may be contained in an NAS container of an RRCSetupComplete message, and the RRCSetupComplete message may include the following information:

a registration request NAS message is carried in the form of an RRC container. The registration request message includes type 3 UE capability information. The NAS container may be DedicatedNAS-Message, or a newly defined NAS container.

eDRX request (requested EDRX cycle length): the AMF checks this information and determines whether the UE supports IDLE EDRX support of IDLE WakeUpSignal capability information security algorithm information supported by the UE whether LPP is supported When the BS 1g-02 sends the registration request NAS message to the AMF, the AMF may perform a procedure required such as authentication, and indicate for the BS 1g-02 to set up security and bearer. The BS 1g-02 may perform a security setup procedure and a UE capability retrieval procedure with the UE 1g-01. In an embodiment of the disclosure, the UE capability may include an NAS UE capability (CN UE capability).

In operation 1g-40, the BS 1g-02 may trigger a UE radio capability retrieval procedure of the UE 1g-01, which may mean that a request for the UE radio capability is sent to the UE 1g-01 in the UE capability enquiry message. On receiving this, the UE 1g-01 puts a UE capability in the UE capability information message in operation 1g-45 and sends the message to the BS 1g-02, and in operation 1g-45, the UE 1g-01 reports the type 1-1 UE capability, the type 1-2 UE capability, and the type 2 UE capability. On receiving this, the network determines various settings to be applied to the UE 1g-01 by considering the UE capability reported by UE and configures the UE accordingly.

FIG. 1H illustrates an operation of a type 2 UE reporting UE capability, according to an embodiment of the disclosure.

In an embodiment of the disclosure, the type 2 UE in an RRC IDLE state may camp on a serving cell that supports the type 2 UE in operation 1h-05. This may be a case that the serving cell sets an SIB1 to include an indicator that supports the type 2 UE and support this. In other words, the UE may check the SIB1 for an indicator indicating whether the type 2 UE is supported and camp on the cell.

In operation 1h-10, the UE may initiate an RRC connection setup procedure for performing a registration procedure, and start an RRC connection procedure for the serving cell. As the maximum bandwidth and data rate supported by the type 2 UE in particular, may be smaller and lower than those of the normal NR UE (type 1 UE), the BS may be required to perform a procedure for determining what type of UE the UE is from an initial RRC connection process. In an embodiment of the disclosure, the normal NR UE (type 1 UE) needs to support a bandwidth of 100 Mbytes, but the type 2 UE may support a much smaller bandwidth (e.g., 10 Mbytes).

In an embodiment of the disclosure, the type 2 UE may perform an RRC connection establishment procedure to try RRC connection to the cell in operation 1h-15, try random access (RRC connection establishment) and transmit the msg 1, i.e., a random access preamble, to the cell. In an embodiment of the disclosure, transmission of the random access preamble may be based on preamble configuration information received in SIB1 of the cell. Afterwards, the UE may receive msg 2, i.e., a random access response (RAR), from the BS. The RSR provides UL resource information for transmitting the msg 3, and the UE transmits the msg 3 (RRCSetupRequest message) to the BS. The UE may report type 1 information (type 1-1 rough UE capability and Type 1-2 rough UE capability) by sending a message assigned a particular LCID for RRC connection establishment. The selecting of the LCID that indicates a CCCH SDU may follow one of the methods as described in FIG. 1G.

The UE receives msg 4 (an RRCSetup message) from the BS in return for the msg 3 to which the new LCID of the operation is applied, applies settings in the msg 4, and in operation 1h-20, creates and sends msg5 (an RRCSetupComplete message) to the BS. Operation 1h-20 in particular may include a method of reporting type 3 information for performing a procedure for requesting registration to a core network (CN). Specifically, a registration request message may be contained in an NAS container of an RRCSetupComplete message, and the RRCSetupComplete message may include the following information:

registration request NAS message is carried in the form of an RRC container. The registration request message includes type 3 UE capability information. The NAS container may be DedicatedNAS-Message, or a newly defined NAS container.

eDRX request (requested EDRX cycle length): the AMF checks this information and determines whether the UE supports IDLE EDRX Support of IDLE WakeUpSignal capability information security algorithm information supported by the UE whether LPP is supported In an embodiment of the disclosure, UE capability that the UE has (which is contained and delivered in the NAS container) may indicate for the AMF to perform a procedure required such as authentication when the BS sends the registration request NAS message to the AMF and for the BS to set up security and establish a bearer. The BS may perform a security setup procedure and a UE capability retrieval procedure with the UE. In an embodiment of the disclosure, the UE capability may include an NAS UE capability (CN UE capability).

In operation 1h-25, the UE may receive a UE capability enquiry message from the BS and then put information, among type 1/2/3 information, to be sent to the BS in the UE capability information message and deliver the message to the BS. In operation 1h-25, the UE may report the type 1-1 UE capability, the type 1-2 UE capability, and the type 2 UE capability summarized in Table 1 of the disclosure, some of which may be, of course, different from what are written in Table 1.

FIG. 1I illustrates an operation of a BS while a type 2 UE performs a UE capability reporting procedure when changed from an IDLE mode to a connected state, according to an embodiment of the disclosure.

In operation 1i-05, the BS may add an indicator that indicates whether the type 2 UE is supported in the SIB1 of a serving cell according to whether the type 2 UE is supported for the serving cell, and set the SIB1 as supporting the type 2 UE. In other words, the UE may check the SIB1 for the indicator indicating whether the type 2 UE is supported and camp on the cell. In operation 1i-10, the BS may receive the msg3 (an RRCSetupRequest message) of the UE and identify whether the type 1 information of the UE is contained. In an embodiment of the disclosure, of the type 1 information, only information to be roughly sent may be sent to the BS in operation 1i-10.

In an embodiment of the disclosure, the type 1 information is information indicating rough UE capability, and information indicating a capability approximate to an actual UE capability and accurate information (actual UE information) may be reported separately. The rough information may be reported in the msg3 (RRCSetupRequest) when the type 2 UE performs the RRC connection establishment procedure with the BS in the serving cell even without being requested by the BS. In other words, the BS may interpret an LCID of the msg3 sent in operation 1i-10 to identify and determine whether the UE is the type 2 UE and what the related rough capability is. For example, the BS may identify a maximum data rate, a maximum bandwidth, a number of Tx/Rx antennas, a layer 2 buffer size, Tx power, etc., supported by the type 2 UE. In an embodiment of the disclosure, a specific value may be additionally requested and reported in the subsequent UE capability information retrieve procedure for some UE capabilities.

As described above, the BS may identify the LCID of the msg3 received in operation 1i-15 to distinguish whether the UE is the type 2 UE and whether type 1 information is included. When the first LCID assignment method as described in FIG. 1G is used, the BS may sort out whether the type 1 UE capability is included or not depending on whether the LCID of the msg3 is the LCID x or the LCID y.

When the received msg3 includes the LCID y (the corresponding MAC SDU is the CCCH SDU, having a size of 57 bits and corresponding to an RRCSetupReqeust message for the type 2 UE), the BS may determine the rough UE capability of the UE, set the msg4 (RRCSetup message) and transmit this to the UE, in operation 1i-20. In operation 1i-25, when receiving msg5 (RRCSetupComplete message) from the UE, the BS may process the msg 5 and send an NAS container registration message (including type 3 information) included in the msg 5 to the AMF.

In operation 1i-30, the BS may perform a procedure such as authentication with the AMF and then receive security and bearer settings from the AMF. Afterwards, in a UE capability request and reception procedure, the BS may send an additional UE capability request (UECapabilityEnquiry) to the UE in operation 1i-35 and in return for this, may receive a UE capability message (UECapabilityInformation), check a specific UE capability, and use this in subsequent RRC configuration and data transmission and reception in operation 1i-40. Especially, in the disclosure, in operation 1i-40, the UE may additionally add UE capabilities written in Table 1 and transmit in a UECapabilityInformation message.

When the received msg3 includes the LCID x (the MAC SDU is the CCCH SDU and has a size of 56 bits), the BS may transmit msg4 (RRCSetup message) in operation 1i-45. For example, when the UE is in an INACTIVE state, the BS may be aware of detailed capacity of the UE so the rough UE capability such as the LCID y may not be included in the msg 3. Operations 1i-50 to 1i-65 correspond to operations 1i-25 to 1i-40, so the detailed description thereof will not be repeated.

Figure 1J:
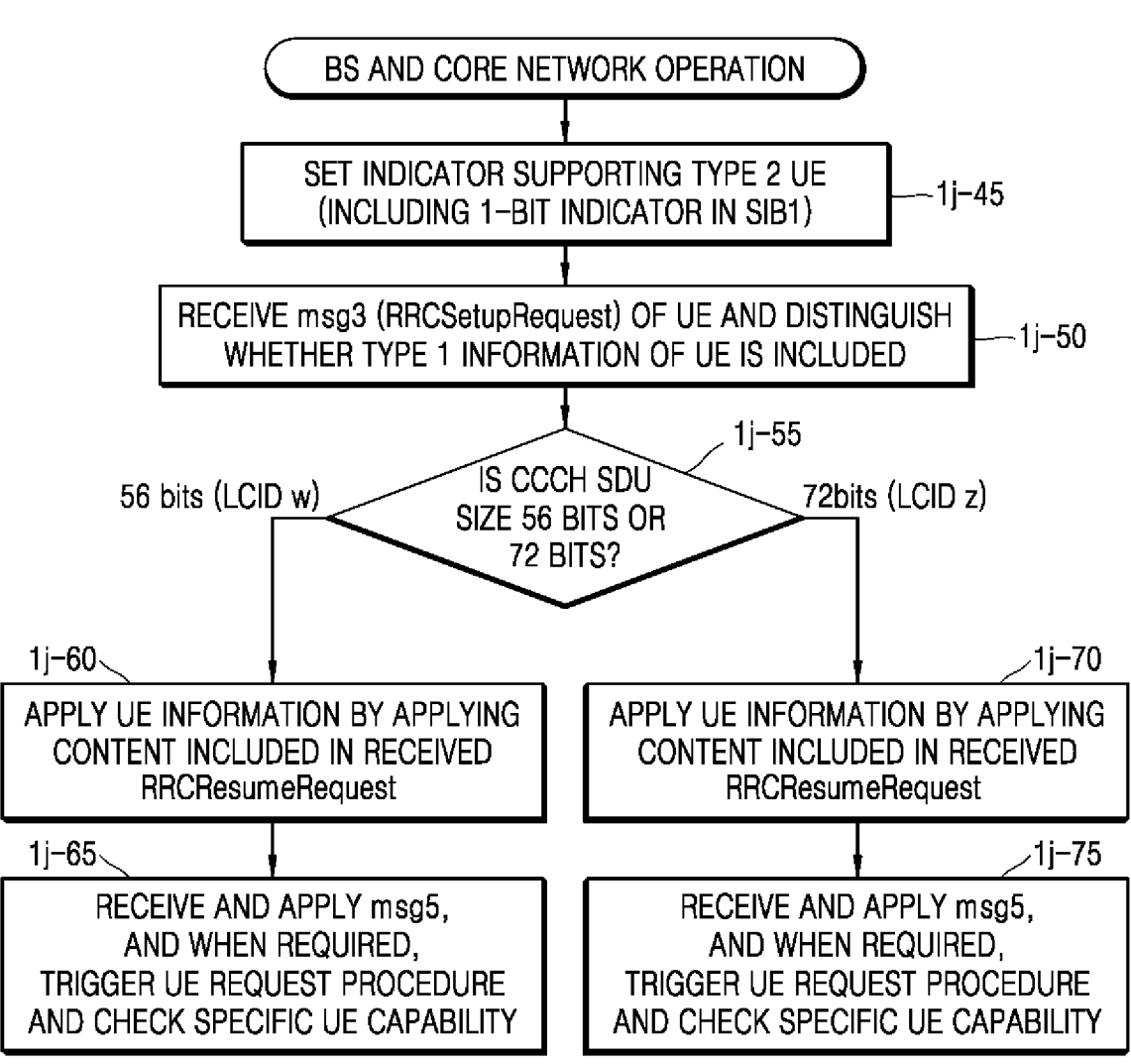
FIG. 1J illustrates an operation of a BS while a type 2 UE performs a UE reporting procedure when the type 2 UE is changed from an INACTIVE mode to a connected state, according to an embodiment of the disclosure.

FIG. 1J illustrates an operation of a BS while a type 2 UE performs a UE reporting procedure when changed from an INACTIVE mode to a connected state, according to an embodiment of the disclosure.

In an embodiment of the disclosure, the UE may be RRC connected to the cell and then switched into the INACTIVE state. In other words, after FIG. 1I, the UE may be switched to be RRC INACTIVE. In operation 1j-45, the BS may add an indicator that indicates whether the type 2 UE is supported in the SIB1 of a serving cell according to whether the type 2 UE is supported for the serving cell, and set the SIB1 as supporting the type 2 UE. In other words, the UE may check the SIB1 for the indicator indicating whether the type 2 UE is supported and camp on the cell. In operation 1j-50, the BS may receive the msg3 (an RRCResumeRequest message) of the UE and may not need to identify whether the type 1 information of the UE is contained. This is because the BS is already aware of the UE capability of a UE in the INACTIVE mode unlike a UE in an RRC IDLE state. In other words, the BS is aware of a detailed capability of the INACTIVE UE, so the UE does not need to inform the rough capability in the corresponding operation. Instead, in operation 1j-50, the BS may check the LCID included in the msg3 of the INACTIVE UE to determine whether the LCID uses a 56-bit or 72-bit CCCH SDU, and in the disclosure, the UE may select one of the LCID w and the LCID z. That is, the first LCID assignment method as described in FIG. 1G may be used. It is, of course, not limited thereto.

The BS identifies the LCID of the received msg3 and determines what length of msg3 (CCCH SDU) has been transmitted in operation 1j-55, and when the LCID w is received, the BS uses the UE information by applying what is included in RRCResumeRequest based on the length of the received msg 3 in operation 1j-60. In operation 1j-65, the BS receives msg5 from the UE and uses it, and when required, may trigger an additional UE request procedure and determine a specific UE capability.

On the other hand, the BS identifies the LCID of the received msg3 and determines what length of msg3 (CCCH SDU) has been transmitted in operation 1j-55, and when the LCID z is received, the BS uses the UE information by applying what is included in RRCResumeRequest based on the length of the received msg 3 in operation 1j-70. In operation 1j-75, the BS receives msg5 from the UE and uses it, and when required, the BS may trigger an additional UE request procedure and determine a specific UE capability.

There is no difference from the existing UE operation in identifying the LCID, and even for the type 2 UE, the fact that a type 3 UE capability may be included among UE capabilities for the type 2 UE in transmitting the msg5 that includes an NAS container in the INACTIVE state may be the same as in the procedure for the UE in the RRC idle mode. In other words, operations 1j-65 and 1j-75 may be operations 1i-25 to 1i-40 as described in FIG. 1I (in a case of an operation of a type 2 INACTIVE UE) or operations 1*i*-50 to 1-65 (in a case of an operation of a type 1 INACTIVE UE).

Figure 1K:
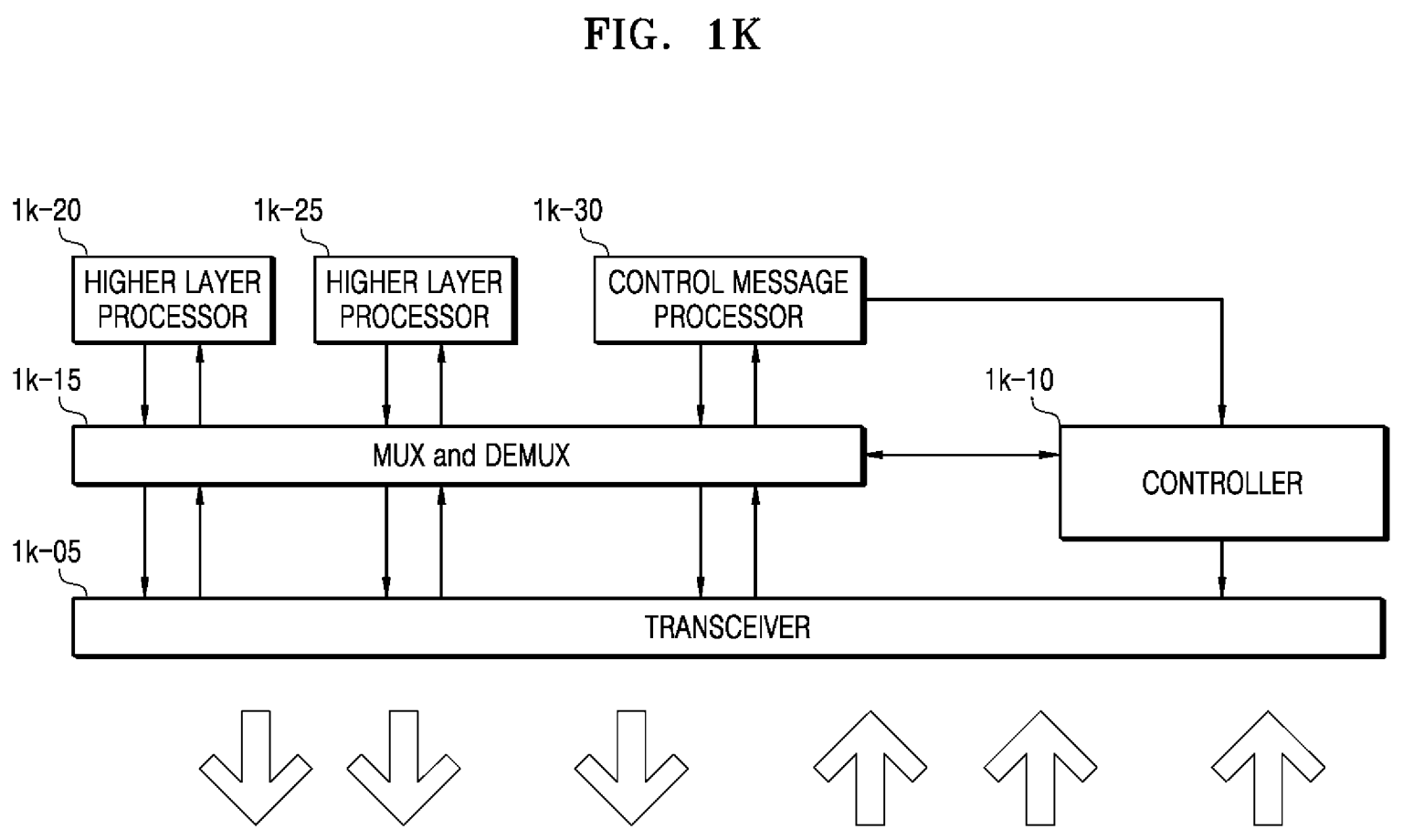

FIG. 1K is a block diagram of a UE, according to an embodiment of the disclosure.

As shown in FIG. 1K, the UE according to the embodiment of the disclosure includes a transceiver 1*k*-05, a controller 1*k*-10, a multiplexer and demultiplexer 1*k*-15, various higher layer processors 1*k*-20 and 1*k*-25 and a control message processor 1*k*-30. It is, of course, not limited thereto, and the UE may include more or fewer components than in FIG. 1K.

The transceiver 1*k*-05 receives data and certain control signals on a forward channel of a serving cell and transmits data and certain control signals on a backward channel. When multiple serving cells are set up, the transceiver 1*k*-05 may perform data transmission or reception and control signal transmission or reception through the multiple serving cells.

The multiplexer and demultiplexer 1*k*-15 may serve to multiplex data generated in the higher layer processors 1*k*-20 and 1*k*-25 or the control message processor 1*k*-30 or demultiplex data received from the transceiver 1*k*-05 and deliver the multiplexing or demultiplexing result to the higher layer processors 1*k*-20 and 1*k*-25 or the control message processor 1*k*-30.

The control message processor 1*k*-30 may transmit or receive a control message to or from a BS and perform a required operation. The control message processor 1*k*-30 includes a function of processing a control message such as an RRC message and an MAC control element (CE), and an RRC message receiving function about a channel busy ratio (CBR) measurement report and resource pool, and UE operations.

The higher layer processor 1*k*-20 or 1*k*-25 may refer to a data radio bearer (DRB) device and may be configured for each service. The higher layer processor 1*k*-20 or 1*k*-25 may process data generated in a user service, such as File Transfer Protocol (FTP) or Voice over Internet Protocol (VoIP) and deliver the result to the multiplexer and demultiplexer 1*k*-15, or process data delivered from the multiplexer and demultiplexer 1*k*-15 and deliver the result to an higher layer service application.

The controller 1*k*-10 checks a scheduling command, e.g., backward grants, received through the transceiver 1*k*-05, and controls the transceiver 1*k*-05 and the multiplexer and demultiplexer 1*k*-15 to perform backward transmission on a proper transmission resource at a suitable point of time.

Although the UE is shown as including a plurality of blocks, each block performing a different function, it is merely an embodiment and not limited thereto. For example, the controller 1*j*-10 itself may perform a function of the demultiplexer 1*k*-15.

Furthermore, although not shown in FIG. 1K, the UE may further include a storage. The storage may store a basic program for operation of the UE, an application program, data like settings information. The storage provides data stored therein at the request of the controller 1*k*-10. The storage may include a storage medium such as a read-only memory (ROM), a random access memory (RAM), a hard disk, a compact disc ROM (CD-ROM), and a digital versatile disk (DVD), or a combination of storage mediums. Moreover, the storage may include a plurality of memories.

In addition, in an embodiment of the disclosure, the controller 1*k*-10 of the UE may perform the aforementioned method of providing capability information to the BS by controlling the respective components of the UE.

Figure 1L:
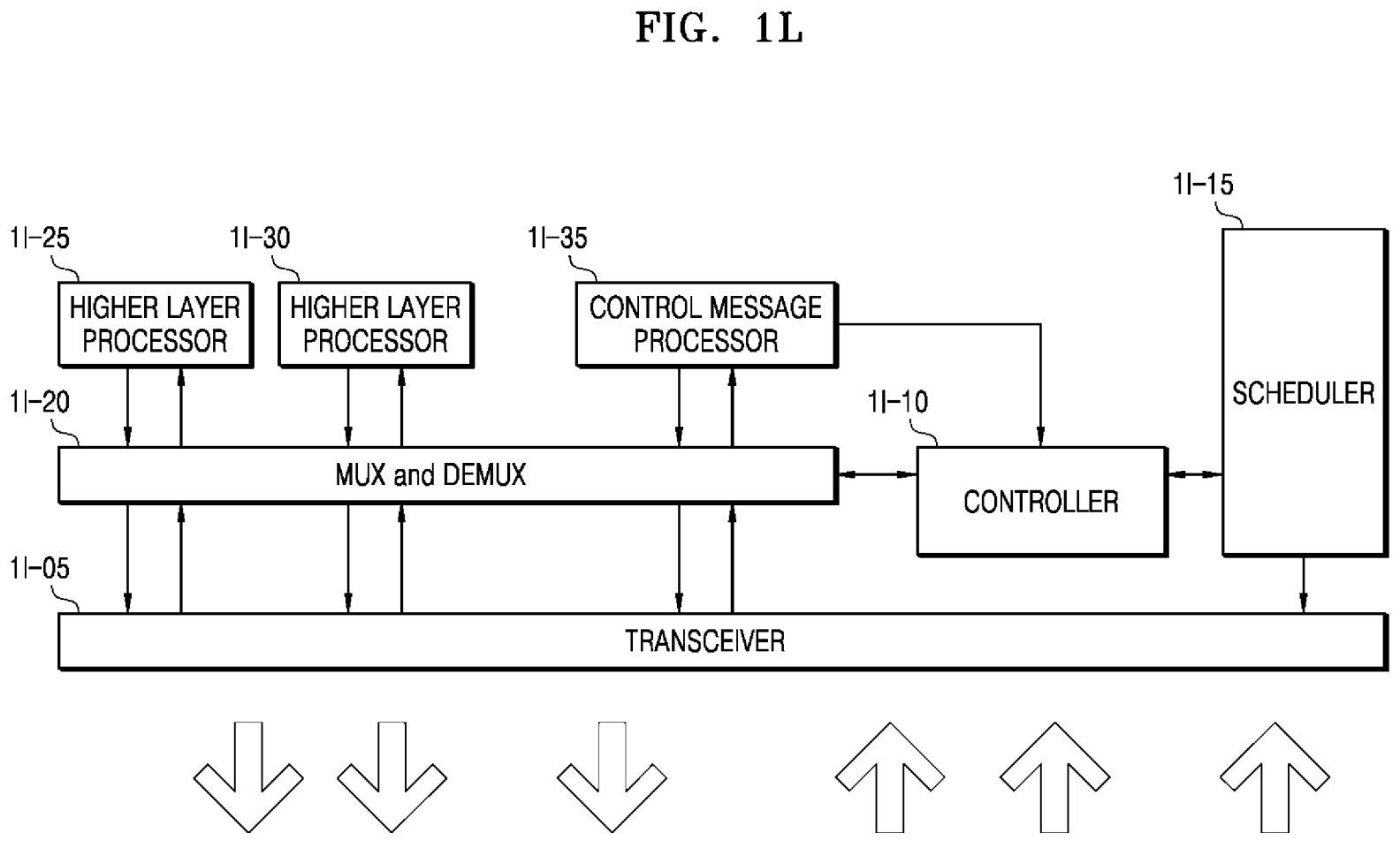

FIG. 1L is a block diagram of a BS, according to an embodiment of the disclosure. The BS of FIG. 1L includes a transceiver 1*l*-05, a controller 1*l*-10, a multiplexer and demultiplexer 1*l*-20, a control message processor 1*l*-35, various higher layer processors 1*l*-25 and 1*l*-30 and a scheduler 1*l*-15.

The transceiver 1*l*-05 transmits data and certain control signals on a forward carrier, and receives data and certain control signals on a backward carrier. When multiple carriers are set, the transceiver 1*l*-05 may perform data transmission and reception and control signal transmission and reception on the multiple carriers.

The multiplexer and demultiplexer 1*l*-20 may serve to multiplex data generated in the higher layer processors 1*l*-25 and 1*l*-30 or the control message processor 1*l*-35 or demultiplex data received from the transceiver 1*l*-05 and deliver the multiplexing or demultiplexing result to the higher layer processors 1*l*-25 and 1*l*-30, the control message processor 1*l*-35, or the controller 1*l*-10.

The control message processor 1*l*-35 receives an indication from the controller 1*l*-10 to create a message and deliver the message to a lower layer. The higher layer processors 1*l*-25 and 1*l*-30 may be configured for each service of each UE, and process data generated in user services, such as FTP or VoIP and deliver the result to the multiplexer and demultiplexer 1*l*-20, or process data delivered from the multiplexer and demultiplexer 1*l*-20 and deliver the result to a higher layer service application.

The scheduler 1*l*-15 may allocate transmission resources to the UE at a proper point of time by taking into account a buffer status of the UE, a channel condition, Active Time of the UE, etc., and control the transceiver to process signals transmitted by the UE or transmit signals to the UE.

Furthermore, although not shown in FIG. 1L, the BS may further include a storage. The storage may store a basic program for operation of the BS, an application program, data like settings information. The storage may store information about a bearer allocated to a connected UE, measurements reported from the UE, etc. Furthermore, the storage may store information used as a criterion for determining whether to provide or stop multi-connection for the UE. The storage provides data stored therein at the request of the controller 1*l*-10. The storage may include a storage medium such as a ROM, a RAM, a hard disk, a CD-ROM, and a DVD, or a combination of storage mediums. Moreover, the storage may include a plurality of memories. In addition, in an embodiment of the disclosure, the controller 1*l*-10 of the BS may perform the aforementioned method of requesting and obtaining capability information from the UE by controlling the respective components of the BS.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents.

Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents. Thus, it will be apparent to those ordinary skilled in the art that the disclosure is not limited to the embodiments of the disclosure described, which have been provided only for illustrative purposes. Furthermore, the embodiments may be operated by being combined with one another if necessary. For example, parts of the methods proposed in the disclosure may be combined to operate the BS and the UE. Although the embodiments of the disclosure are proposed based on 5G or NR systems, modifications to the embodiments of the disclosure, which do not deviate from the scope of the disclosure, may be applicable to other systems such as an LTE system, an LTE-A system, an LTE-A-Pro system, etc.

The invention claimed is:

1. A method performed by a user equipment (UE) in a wireless communication system, the method comprising:

receiving, from a base station (BS), system information (SI) including information indicating whether a reduced capability (RedCap) UE is supported on a cell;

transmitting, to the BS, a random access (RA) preamble based on preamble configuration information included in the SI;

in response to the RA preamble, receiving, from the BS, a RA response (RAR) including resource information;

transmitting, to the BS, a message3 (Msg3) including a logical channel identifier (LCID), wherein the LCID is used to report first RedCap UE capability information; and based on a message4 (Msg4) received in response to the Msg3, transmitting, to the BS, a message (Msg) including second RedCap UE capability information, wherein the LCID is associated with at least one of:

a maximum transmission power of the UE, a maximum data rate of the UE, or a maximum channel bandwidth of the UE, and wherein the Msg includes at least one of Extended Discontinuous Reception (eDRX) request, support of IDLE WakeUpSignal capability information, security algorithm information supported by the UE, or information whether LTE Positioning Protocol (LPP) is supported.

2. The method of claim 1, wherein when the Msg3 is an RRCSetupRequest message, a size of the RRCSetupRequest message associated with the LCID is M bits, and wherein when the Msg3 is an RRCResumeRequest message, a size of the RRCResumeRequest message associated with the LCID is one of M bits or N bits.

3. The method of claim 1, further comprising:

receiving, from the BS, a UE capability enquiry message; and transmitting, to the BS, a UE capability information message including third RedCap UE capability information.

4. The method of claim 1, further comprising:

wherein the Msg comprises a non-access stratum (NAS) container including a registration request message to a core network (CN).

5. A method performed by a base station (BS) in a wireless communication system, the method comprising:

transmitting, to a user equipment (UE), system information (SI) including information indicating whether a reduced capability (RedCap) UE is supported on a cell;

receiving, from the UE, a random access (RA) preamble based on preamble configuration information included in the SI;

in response to the RA preamble, transmitting, to the UE, a RA response (RAR) including resource information;

receiving, from the UE, a message3 (Msg3) including a logical channel identifier (LCID), wherein the LCID is used to report first RedCap UE capability information; and based on a message4 (Msg4) transmitted in response to the Msg3, receiving, from the UE, a message (Msg) including second RedCap UE capability information, wherein the LCID is associated with at least one of:

a maximum transmission power of the UE, a maximum data rate of the UE, or a maximum channel bandwidth of the UE, and wherein the Msg includes at least one of Extended Discontinuous Reception (eDRX) request, support of IDLE WakeUpSignal capability information, security algorithm information supported by the UE, or information whether LTE Positioning Protocol (LPP) is supported.

6. The method of claim 5, wherein when the Msg3 is an RRCSetupRequest message, a size of the RRCSetupRequest message associated with the LCID is M bits, and wherein when the Msg3 is an RRCResumeRequest message, a size of the RRCResumeRequest message associated with the LCID is one of M bits or N bits.

7. The method of claim 5, further comprising:

transmitting, to the UE, a UE capability enquiry message; and receiving, from the UE, a UE capability information message including third RedCap UE capability information.

8. The method of claim 5, further comprising:

wherein the Msg comprises a non-access stratum (NAS) container including a registration request message to a core network (CN).

9. A user equipment (UE) in a wireless communication system, the UE comprising:

a transceiver; and at least one processor coupled with the transceiver and configured to:

receive, from a base station (BS), system information (SI) including information indicating whether a reduced capability (RedCap) UE is supported on a cell, transmit, to the BS, a random access (RA) preamble based on preamble configuration information included in the SI, in response to the RA preamble, receive, from the BS, a RA response (RAR) including resource information, transmit, to the BS, a message3 (Msg3) including a logical channel identifier (LCID), wherein the LCID is used to report first RedCap UE capability information, and based on a message4 (Msg4) received in response to the Msg3, transmit, to the BS, a message (Msg) including second RedCap UE capability information, wherein the LCID is associated with at least one of:

a maximum transmission power of the UE, a maximum data rate of the UE, or a maximum channel bandwidth of the UE, and wherein the Msg includes at least one of Extended Discontinuous Reception (eDRX) request, support of IDLE WakeUpSignal capability information, security algorithm information supported by the UE, or information whether LTE Positioning Protocol (LPP) is supported.

10. The UE of claim 9, wherein when the Msg3 is an RRCSetupRequest message, a size of the RRCSetupRequest message associated with the LCID is M bits, and wherein when the Msg3 is an RRCResumeRequest message, a size of the RRCResumeRequest message associated with the LCID is one of M bits or N bits.

11. The UE of claim 9, wherein the at least one processor is further configured to:

receive, from the BS, a UE capability enquiry message, and transmit, to the BS, a UE capability information message including third RedCap UE capability information.

12. The UE of claim 9, wherein the at least one processor is further configured to:

wherein the Msg comprises a non-access stratum (NAS) container including a registration request message to a core network (CN).

13. A base station (BS) in a wireless communication system, the BS comprising:

a transceiver; and at least one processor coupled with the transceiver and configured to:

transmit, to a user equipment (UE), system information (SI) including information indicating whether a reduced capability (RedCap) UE is supported on a cell, receive, from the UE, a random access (RA) preamble based on preamble configuration information included in the SI, in response to the RA preamble, transmit, to the UE, a RA response (RAR) including resource information, receive, from the UE, a message3 (Msg3) including a logical channel identifier (LCID), wherein the LCID is used to report first RedCap UE capability information, and based on a message4 (Msg4) transmitted in response to the Msg3, receive, from the UE, a message (Msg) including second RedCap UE capability information, wherein the LCID is associated with at least one of:

a maximum transmission power of the UE, a maximum data rate of the UE, or a maximum channel bandwidth of the UE, and wherein the Msg includes at least one of Extended Discontinuous Reception (eDRX) request, support of IDLE WakeUpSignal capability information, security algorithm information supported by the UE, or information whether LTE Positioning Protocol (LPP) is supported.

14. The BS of claim 13, wherein when the Msg3 is an RRCSetupRequest message, a size of the RRCSetupRequest message associated with the LCID is M bits, and wherein when the Msg3 is an RRCResumeRequest message, a size of the RRCResumeRequest message associated with the LCID is one of M bits or N bits.

15. The BS of claim 13, wherein the at least one processor is further configured to:

transmit, to the UE, a UE capability enquiry message, and receive, from the UE, a UE capability information message including third RedCap UE capability information.

16. The BS of claim 13, wherein the at least one processor is further configured to:

wherein the Msg comprises a non-access stratum (NAS) container including a registration request message to a core network (CN).

* * * * *